(12) United States Patent
Kumar et al.

(10) Patent No.: US 10,999,202 B2
(45) Date of Patent: May 4, 2021

(54) METHODS, SYSTEMS, AND COMPUTER READABLE MEDIA FOR DISTRIBUTING SIGTRAN CONNECTIONS AMONG SIGNAL TRANSFER POINT (STP) MESSAGE PROCESSORS

(71) Applicant: Oracle International Corporation, Redwood Shores, CA (US)

(72) Inventors: Vipin Kumar, Bangalore (IN); Yesh Goel, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/206,592

(22) Filed: Nov. 30, 2018

(65) Prior Publication Data
US 2020/0177508 A1    Jun. 4, 2020

(51) Int. Cl.
*H04L 12/803* (2013.01)
*H04L 12/939* (2013.01)
(Continued)

(52) U.S. Cl.
CPC .......... *H04L 47/125* (2013.01); *H04L 49/555* (2013.01); *H04L 61/103* (2013.01); *H04M 7/066* (2013.01)

(58) Field of Classification Search
CPC ... H04L 47/125; H04L 61/103; H04L 49/555; H04M 7/066; H04Q 3/0025
(Continued)

(56) References Cited

U.S. PATENT DOCUMENTS

| 5,278,890 A | 1/1994 | Beeson et al. |
| 5,650,998 A | 7/1997 | Angenot et al. |

(Continued)

FOREIGN PATENT DOCUMENTS

| CN | 1777143 A | 5/2006 |
| CN | 101136943 A | 3/2008 |

(Continued)

OTHER PUBLICATIONS

Intelligent Network Services in Migration from PSTN toward NGN; Mahmoud Saeidi, Mahmoud Pirhadi, Fattaneh Ayazi;Iran Telecommunication Research Center; Tehran, Iran. (Year: 2006).*

(Continued)

*Primary Examiner* — Hassan A Phillips
*Assistant Examiner* — Mohammed S Chowdhury
(74) *Attorney, Agent, or Firm* — Jenkins, Wilson, Taylor & Hunt, P.A.

(57) ABSTRACT

A method for distributing Sigtran connections among signal transfer point (STP) message processors includes providing a connection load balancer as a front end to plural message processors of an STP. The method further includes publishing, by the connection load balancer, an Internet protocol (IP) address to SS7 peers. The method further includes initializing the message processors of the STP to listen on the IP address published by the connection load balancer. The method further includes receiving, at the connection load balancer, a Sigtran message addressed to the IP address. The method further includes determining, by the connection load balancer, whether the Sigtran message is an initial message for a Sigtran connection or a subsequent message for a Sigtran connection and whether the Sigtran connection has been assigned to one of the message processors. The method further includes forwarding the message to one of the message processors or dropping the message based on (Continued)

whether the message is an initial message or a subsequent message and based on whether the connection has been assigned to one of the message processors.

14 Claims, 10 Drawing Sheets

(51) Int. Cl.
    *H04L 29/12* (2006.01)
    *H04M 7/06* (2006.01)
(58) Field of Classification Search
    USPC .......................................................... 370/229
    See application file for complete search history.

(56) References Cited

U.S. PATENT DOCUMENTS

| | | | |
|---|---|---|---|
| 5,926,482 A | 7/1999 | Christie et al. | |
| 6,029,191 A | 2/2000 | Kurashima | |
| 6,108,409 A | 8/2000 | Cooper et al. | |
| 6,157,621 A | 12/2000 | Brown et al. | |
| 6,282,280 B1 | 8/2001 | Rekieta et al. | |
| 6,327,472 B1 | 12/2001 | Westroos et al. | |
| 6,515,985 B2 | 2/2003 | Shmulevich et al. | |
| 6,628,672 B1 | 9/2003 | Cabello | |
| 6,647,113 B2 | 11/2003 | McCann et al. | |
| 6,662,017 B2 | 12/2003 | McCann et al. | |
| 6,678,369 B2 | 1/2004 | DeMent et al. | |
| 6,760,343 B1 | 7/2004 | Krishnamurthy et al. | |
| 6,785,378 B2 | 8/2004 | Mar | |
| 6,788,774 B1 | 9/2004 | Caldwell et al. | |
| 6,826,198 B2 | 11/2004 | Turina et al. | |
| 6,901,262 B2 | 5/2005 | Allison et al. | |
| 6,944,184 B1 | 9/2005 | Miller et al. | |
| 6,965,567 B2 | 11/2005 | Ramos et al. | |
| 7,023,794 B2 | 4/2006 | Khan et al. | |
| 7,043,003 B1 | 5/2006 | Friedl | |
| 7,050,562 B2 | 5/2006 | Allison et al. | |
| 7,068,773 B2 | 6/2006 | McCann et al. | |
| 7,079,499 B1 | 7/2006 | Akhtar et al. | |
| 7,092,388 B2 | 8/2006 | Jarlstedt | |
| 7,092,505 B2 | 8/2006 | Allison et al. | |
| 7,127,057 B2 | 10/2006 | Delaney et al. | |
| 7,136,477 B2 | 11/2006 | Craig et al. | |
| 7,197,036 B2 | 3/2007 | Craig | |
| 7,222,192 B2 | 5/2007 | Allison et al. | |
| 7,257,215 B2 | 8/2007 | Angermayr et al. | |
| 7,260,086 B2 | 8/2007 | Delaney et al. | |
| 7,286,524 B1 | 10/2007 | Loftus | |
| 7,298,725 B2 | 11/2007 | Rune | |
| 7,372,953 B2 | 5/2008 | Delaney et al. | |
| 7,403,492 B2 | 7/2008 | Zeng et al. | |
| 7,440,472 B2 | 10/2008 | Delaney et al. | |
| 7,477,646 B1 | 1/2009 | Peterson et al. | |
| 7,522,580 B2 | 4/2009 | Miller et al. | |
| 7,532,647 B2 | 5/2009 | Eichler et al. | |
| 7,554,974 B2 | 6/2009 | Palmer et al. | |
| 7,564,870 B2 | 7/2009 | Miller et al. | |
| 7,590,732 B2 | 9/2009 | Rune | |
| 7,633,969 B2 | 12/2009 | Caugherty et al. | |
| 7,760,706 B2 | 7/2010 | Delaney et al. | |
| 7,892,991 B2 | 2/2011 | Yamanaka et al. | |
| 7,898,957 B2 | 3/2011 | Lea et al. | |
| 7,970,402 B2 | 6/2011 | Wu et al. | |
| 8,201,219 B2 | 6/2012 | Jones | |
| 8,369,313 B2 | 2/2013 | Lu et al. | |
| 8,423,678 B2 | 4/2013 | Darbyshire et al. | |
| 8,468,267 B2 | 6/2013 | Yigang et al. | |
| 8,478,828 B2 | 7/2013 | Craig et al. | |
| 8,483,233 B2 | 7/2013 | Craig et al. | |
| 8,504,630 B2 | 8/2013 | Craig et al. | |
| 8,549,146 B2 | 10/2013 | Stanisic et al. | |
| 8,578,050 B2 | 11/2013 | Craig et al. | |
| 8,687,622 B2 | 4/2014 | McNair et al. | |
| 8,737,210 B2 | 5/2014 | Tremblay et al. | |
| 8,799,391 B2 | 8/2014 | Craig et al. | |
| 8,817,627 B2 | 8/2014 | Delaney et al. | |
| 8,855,082 B2 | 10/2014 | Grayson et al. | |
| 8,879,431 B2 | 11/2014 | Ridel et al. | |
| 8,948,016 B2 | 2/2015 | Kruglick | |
| 8,958,306 B2 | 2/2015 | McCann et al. | |
| 8,996,614 B2 | 3/2015 | Choudhary et al. | |
| 9,088,478 B2 | 7/2015 | Craig et al. | |
| 9,332,053 B2 | 5/2016 | Sheer | |
| 9,652,277 B2 | 5/2017 | Broustis et al. | |
| 9,729,454 B2 | 8/2017 | Zaidi et al. | |
| 10,027,577 B2 | 7/2018 | Karandikar et al. | |
| 2001/0029182 A1 | 10/2001 | McCann et al. | |
| 2001/0055380 A1 | 12/2001 | Benedyk et al. | |
| 2002/0069278 A1 | 6/2002 | Forslöw | |
| 2002/0116522 A1 | 8/2002 | Zelig | |
| 2002/0141346 A1 | 10/2002 | Garcia-Luna-Aceves et al. | |
| 2002/0176430 A1 | 11/2002 | Sangha et al. | |
| 2002/0186702 A1 | 12/2002 | Ramos et al. | |
| 2003/0016684 A1* | 1/2003 | Prasad | H04Q 3/0025 370/410 |
| 2003/0061234 A1 | 3/2003 | Ali et al. | |
| 2003/0108067 A1 | 6/2003 | Craig et al. | |
| 2003/0115358 A1 | 6/2003 | Yun | |
| 2003/0169779 A1 | 9/2003 | Craig | |
| 2004/0037278 A1 | 2/2004 | Wong et al. | |
| 2004/0081206 A1 | 4/2004 | Allison et al. | |
| 2004/0203849 A1 | 10/2004 | Allison et al. | |
| 2004/0240658 A1 | 12/2004 | Delaney et al. | |
| 2004/0264671 A1* | 12/2004 | Lamberton | H04L 12/66 379/221.03 |
| 2004/0264675 A1 | 12/2004 | Delaney et al. | |
| 2005/0013290 A1 | 1/2005 | Allison et al. | |
| 2005/0047401 A1 | 3/2005 | Garnero et al. | |
| 2005/0111442 A1* | 5/2005 | Delaney | H04Q 3/0025 370/357 |
| 2005/0120095 A1 | 6/2005 | Aman et al. | |
| 2005/0232407 A1 | 10/2005 | Craig et al. | |
| 2005/0235065 A1 | 10/2005 | Le et al. | |
| 2006/0013264 A1 | 1/2006 | Eichler et al. | |
| 2006/0067503 A1* | 3/2006 | Caugherty | H04Q 3/0025 379/221.07 |
| 2006/0101159 A1 | 5/2006 | Yeh et al. | |
| 2006/0209695 A1* | 9/2006 | Archer, Jr. | G06F 9/50 370/235 |
| 2007/0180113 A1 | 8/2007 | Van Bemmel | |
| 2008/0013446 A1 | 1/2008 | Xu et al. | |
| 2008/0043614 A1 | 2/2008 | Soliman | |
| 2008/0127232 A1 | 5/2008 | Langen et al. | |
| 2008/0146763 A1 | 6/2008 | Yamanaka et al. | |
| 2008/0192744 A1* | 8/2008 | Simon | H04Q 11/0478 370/389 |
| 2008/0282254 A1 | 11/2008 | Blander et al. | |
| 2009/0041043 A1 | 2/2009 | Belling et al. | |
| 2009/0083861 A1 | 3/2009 | Jones | |
| 2010/0299451 A1 | 11/2010 | Yigang et al. | |
| 2011/0035437 A1* | 2/2011 | Toumura | H04L 67/1002 709/203 |
| 2011/0075564 A1* | 3/2011 | Wung | H04L 41/5054 370/237 |
| 2011/0116382 A1 | 5/2011 | McCann et al. | |
| 2011/0185065 A1 | 7/2011 | Stanisic et al. | |
| 2011/0199906 A1 | 8/2011 | Kanode et al. | |
| 2011/0200053 A1 | 8/2011 | Kanode et al. | |
| 2011/0200054 A1 | 8/2011 | Craig et al. | |
| 2011/0202604 A1 | 8/2011 | Craig et al. | |
| 2011/0202612 A1 | 8/2011 | Craig et al. | |
| 2011/0202613 A1 | 8/2011 | Craig et al. | |
| 2011/0202614 A1 | 8/2011 | Graig et al. | |
| 2011/0202676 A1 | 8/2011 | Craig et al. | |
| 2011/0202677 A1 | 8/2011 | Craig et al. | |
| 2011/0202684 A1 | 8/2011 | Craig et al. | |
| 2011/0314178 A1 | 12/2011 | Kanode et al. | |
| 2012/0158872 A1 | 6/2012 | McNamee et al. | |
| 2012/0191847 A1 | 7/2012 | Nas et al. | |
| 2012/0221899 A1 | 8/2012 | Cervenak et al. | |
| 2012/0226758 A1 | 9/2012 | Sprague et al. | |

(56) References Cited

U.S. PATENT DOCUMENTS

| | | | |
|---|---|---|---|
| 2012/0230187 A1* | 9/2012 | Tremblay | H04L 67/1027 370/230 |
| 2012/0233240 A1 | 9/2012 | Chatilla et al. | |
| 2013/0064093 A1 | 3/2013 | Ridel et al. | |
| 2013/0094362 A1 | 4/2013 | Qiu et al. | |
| 2013/0117847 A1 | 5/2013 | Friedman et al. | |
| 2013/0322430 A1 | 12/2013 | Mann | |
| 2013/0329740 A1 | 12/2013 | Wallace et al. | |
| 2013/0339540 A1 | 12/2013 | Sheer | |
| 2013/0346549 A1 | 12/2013 | Craig et al. | |
| 2014/0153563 A1* | 6/2014 | Hlibiciuc | H04M 7/0093 370/352 |
| 2014/0237111 A1 | 8/2014 | McMurry et al. | |
| 2014/0304415 A1 | 10/2014 | Prakash et al. | |
| 2014/0348176 A1 | 11/2014 | Sprague et al. | |
| 2016/0057214 A1 | 2/2016 | Anand et al. | |
| 2016/0094383 A1* | 3/2016 | Wang | G06F 16/951 709/221 |
| 2016/0191631 A1 | 6/2016 | Haraszti et al. | |
| 2016/0212052 A1* | 7/2016 | Zaidi | H04L 47/193 |
| 2017/0034048 A1 | 2/2017 | Karandikar et al. | |
| 2020/0169878 A1* | 5/2020 | Thomas | H04W 12/1202 |

FOREIGN PATENT DOCUMENTS

| | | |
|---|---|---|
| CN | 101150512 A | 3/2008 |
| CN | 101588606 A | 11/2009 |
| CN | ZL 201180018814.2 | 2/2011 |
| CN | ZL 201180013681.X | 6/2015 |
| CN | 102893556 B | 8/2016 |
| CN | ZL 201510317392.9 | 4/2018 |
| EP | 1 134 939 A1 | 9/2001 |
| EP | 2 534 790 B1 | 4/2016 |
| IN | 338985 | 6/2020 |
| IN | 346335 | 9/2020 |
| JP | H0537596 | 2/1993 |
| WO | WO 2000/60812 | 10/2000 |
| WO | WO 2005/052743 | 6/2005 |
| WO | WO 2006/036500 A2 | 4/2006 |
| WO | WO 2008/105976 | 9/2008 |
| WO | WO 2009/042062 A2 | 4/2009 |
| WO | WO-2009/043384 A1 | 4/2009 |
| WO | WO 2009/043384 A1 | 4/2009 |
| WO | WO 2009/070179 A1 | 6/2009 |
| WO | WO 2009/128837 A1 | 10/2009 |
| WO | WO 2011/100587 | 8/2011 |
| WO | WO 2011/100594 | 8/2011 |
| WO | WO 2011/100603 | 8/2011 |
| WO | WO 2020/112154 A1 | 6/2020 |

OTHER PUBLICATIONS

Routing and Congestion Control in Common Channel Signaling System No. 7;Bijan Jabbari,IEEE 1992. (Year: 1992).*
SS7 Over IP ; Signaling Interworking Vulnerabilities; Hemant Sengar, Ram Dantu, IEEE 2006 (Year: 2006).*
Transport of Mobile Application Part Signaling over Internet Protocol;Robin Cher Nung Chiang, Amardiya Sesmun, and Gerry Foster; IEEE Communication Magazine. May 2002 (Year: 2002).*
Notification of Transmittal of the International Search Report and the Written Opinion of the International Searching Authority, or the Declaration for International Application No. PCT/US2019/018992 (dated Aug. 19, 2019).
Decision to grant a European patent pursuant to Article 97(1) EPC for European Patent Application No. 11742894.6 (dated Jun. 28, 2018).
First Examination RFeport for Indian Patent Application No. 6816/CHENP/2012 (dated May 10, 2018).
Notice of Allowance and Fee(s) Due for U.S. Appl. No. 14/813,072 (dated Mar. 21, 2018).
Communication under Rule 71(3) EPC for European Patent Application No. 11 742 894.6 (dated Feb. 22, 2018).
Letter Regarding Notification to Grant for Chinese Patent Application No. ZL201510317392.9 (dated Jan. 30, 2018).
Advisory Action Before the Filing of an Appeal Brief for U.S. Appl. No. 14/813,072 (dated Jan. 11, 2018).
Communication pursuant to Article 94(3) EPC for European Application No. 11 742 894.6 (dated Nov. 30, 2017).
Final Office Action for U.S. Appl. No. 14/813,072 (dated Nov. 3, 2017).
Notification of the First Office Action for Chinese Patent Application No. 201510317392.9 (dated Jun. 20, 2017).
Non-Final Office Action for U.S. Appl. No. 14/813,072 (dated May 12, 2017).
Notice of Allowance and Fee(s) due for U.S. Appl. No. 14/601,906 (dated Mar. 31, 2017).
Communication pursuant to Article 94(3) EPC corresponding to European Application No. 11 742 894.6 (dated Dec. 2, 2016).
Non-Final Office Action for U.S. Appl. No. 14/601,906 (dated Sep. 30, 2016).
Letter regarding Certificate of Patent for Israeli Patent Application No. 221424 (dated Jul. 1, 2016).
Letter regarding Decision to Grant for Chinese Application No. ZL201180013555.4 (dated Apr. 21, 2016).
Letter regarding Decision to Grant for European Application No. 11742901.9 (dated Apr. 1, 2016).
Letter regarding Notification to Grant for Chinese Patent Application No. ZL201180018814.2 (dated Jul. 20, 2015).
Extended European Search Report for European Application No. 11742906.8 (dated Jun. 26, 2015).
Letter regarding Decision to Grant for Chinese Patent Application No. ZL201180013681.X (dated Apr. 13, 2015).
Second Office Action for Chinese Patent Application No. 201180013555.4 (dated Mar. 20, 2015).
Letter regarding Notice Before Examination for Israel Patent Application No. 221424 (dated Jan. 11, 2015).
First Office Action for Chinese Patent Application No. 201180018814.2 (dated Oct. 30, 2014).
First Office Action for Chinese Application No. 201180013681.X (dated Aug. 18, 2014).
First Office Action for Chinese Patent Application No. 201180013555.4 (dated Jul. 3, 2014).
Notice of Allowance for U.S. Appl. No. 12/797,197 dated May 21, 2014.
Notice of Allowance and Fee(s) Due for U.S. Appl. No. 13/932,608 (dated Apr. 9, 2014).
Final Office Action for U.S. Appl. No. 12/797,197 dated Jan. 27, 2014.
"Diameter Interface Support," Chapter 2, Cisco Service Control Mobile Solution Guide, http://www.cisco.com/c/en/us/td/docs/cable/serv_exch/serv_control/broadband_app/rel41x/mobile_sol/mobile_sol/02_mobile_diameter.pdf, pp. 2-1-2-8 (Dec. 23, 2013).
Extended European Search Report for European Application No. 11742894.6 (dated Dec. 3, 2013).
"IP Front End (IPFE) User Guide," Eagle® XG Diameter Signaling Router, 910-6826-001 Revision A, pp. 1-29 (Nov. 2013).
Non-Final Office Action for U.S. Appl. No. 12/797,197 dated Jul. 3, 2013.
Commonly-Assigned, Co-Pending Continuation U.S. Appl. No. 13/932,608 titled "Methods, Systems, and Computer Readable Media for Inter-Diameter-Message Processor Routing," (unpublished, filed Jul. 1, 2013).
Notice of Allowance and Fee(s) Due for U.S. Appl. No. 13/026,076 (dated Jun. 27, 2013).
Notice of Allowance and Fee(s) Due for U.S. Appl. No. 13/026,031 (dated May 30, 2013).
Supplemental Notice of Allowability for U.S. Appl. No. 13/025,968 (dated Apr. 1, 2013).
Supplemental Notice of Allowability for U.S. Appl. No. 13/026,031 (dated Mar. 22, 2013).
Notice of Allowance and Fee(s) Due for U.S. Appl. No. 13/025,968 (dated Feb. 27, 2013).
Final Office Action for U.S. Appl. No. 12/797,197 dated Feb. 11, 2013.

(56) References Cited

OTHER PUBLICATIONS

Notice of Allowance and Fee(s) Due for U.S. Appl. No. 13/026,031 (dated Jan. 30, 2013).
Final Official Action for U.S. Appl. No. 13/026,076 (dated Dec. 7, 2012).
Communication of European Publication Number and Information on the Application of Article 67(3) EPC for European Patent Application No. 11742906.8 (dated Nov. 21, 2012).
Communication of European Publication Number and Information on the Application of Article 67(3) EPC for European Patent Application No. 11742901.9 (dated Nov. 21, 2012).
Communication of European Publication Number and Information on the Application of Article 67(3) EPC for European Patent Application No. 11742894.6 (dated Nov. 21, 2012).
Fajardo et al., "Diameter Base Protocol," RFC 6733, pp. 1-152 (Oct. 2012).
Non-Final Office Action for U.S. Appl. No. 12/797,197 dated Jul. 9, 2012.
Non-Final Office Action for U.S. Appl. No. 13/026,076 (dated Jun. 4, 2012).
Notification of Transmittal of the International Search Report and the Written Opinion of the International Searching Authority, or the Declaration for International Application No. PCT/US2011/024614 (dated Oct. 31, 2011).
Notification of Transmittal of the International Search Report and the Written Opinion of the International Searching Authority, or the Declaration for International Application No. PCT/US2011/024601 (dated Oct. 20, 2011).
Notification of Transmittal of the International Search Report and the Written Opinion of the International Searching Authority, or the Declaration for International Application No. PCT/US2011/024588 (dated Oct. 20, 2011).
Communication pursuant to Article 94(3) EPC for European Application No. 04 811 530.7 (dated Feb. 11, 2011).
Notice of Allowance for U.S. Appl. No. 10/993,738 dated Jun. 25, 2010.
Commonly-assigned, co-pending U.S. Appl. No. 12/797,197 for "Methods and Systems for Message Transfer Part (MTP) Load Sharing Using MTP Load Sharing Groups", (Unpublished, filed Jun. 9, 2010).
Notice of Allowance for U.S. Appl. No. 10/993,738 dated Mar. 5, 2010.
"Traffix Diameter Gateway; Instant Diameter Connection to any Network Element," Traffix Systems, pp. 1-4 (Publication Date Unknown) (Downloaded from the Internet on Feb. 8, 2010).
"Traffix Diameter Load Balancer; Scaling the Diameter Control Plane," Traffix Systems, pp. 1-4 (Publication Date Unknown) (Downloaded from the Internet on Feb. 8, 2010).
"Next Generation Networks Load Balancing—The Key to NGN Control, Management, and Growth," Whitepaper by Traffix Systems, pp. 1-7 (Publication Date Unknown) (Downloaded from the Internet on Feb. 8, 2010).
"Universal Mobile Telecommunications Systems (UMTS); LTE; InterWorking Function (IWF) Between MAP Based and Diameter Based Interfaces (3GPP TS 29.305 Version 9.0.0 Release 9)," ETSI TS 129 305 V9.0.0 (Jan. 2010).
"Digital Cellular Telecommunications System (Phase 2+); Universal Mobile Telecommunications System (UMTS); LTE; IP Multimedia (IM) Subsystem Cx and Dx Interfaces; Signalling Flows and Message Contents (3GPP TS 29.228 Version 8.7.0 Release 8)," ETSI TS 129 228 v8.7.0 (Jan. 2010).
Jones et al., "Diameter Extended NAPTR," Individual Submission Internet—Draft, draft-ietf-dime-extended-naptr-00, pp. 1-9 (Dec. 29, 2009).
3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
Jiao et al., "The Diameter Capabilities Update Application," Network Working Group Internet-Draft draft-ietf-dime-capabilities-update-01, pp. 1-8 (Dec. 1, 2009).
Supplemental Notice fo Allowability for U.S. Appl. No. 11/147,144 (dated Nov. 17, 2009).
Tsou et al., "Realm-Based Redirection in Diameter," Internet Engineering Task Force, draft-ietf-dime-realm-based-redirect-02, pp. 1-7 (Oct. 27, 2009).
Huang et al., "The Diameter Precongestion Notification (PCN) Data Collection Applications," Network Working Group Internet—Draft <draft-huang-dime-pcn-collection-02>, pp. 1-19 (Oct. 26, 2009).
Carlberg et al., "Diameter Priority Attribute Value Pairs," Diameter Maintenance and Extensions (DIME) Internet—Draft <draft-carlberg-dime-priority-avps-00.txt>, pp. 1-6 (Oct. 19, 2009).
Korhonen et al., "Diameter User-Name and Realm Based Request Routing Clarifications," Diameter Maintenance and Extensions (DIME) Internet—Draft, draft-ietf-dime-nai-routing-04.txt, pp. 1-13 (Oct. 6, 2009).
Fajardo et al., "Diameter Base Protocol," DIME Internet—Draft, draft-ietf-dime-rfc3588bis-19.txt, pp. 1-160 (Sep. 2, 2009).
Notice of Allowance and Fee(s) Due for U.S. Appl. No. 11/147,144 (dated Aug. 17, 2009).
Tsou et al., "Session-Spectific Explicit Diameter Request Routing," Network Working Group Internet—Draft, draft-tsou-diameter-explicit-routing-03, pp. 1-18 (Aug. 5, 2009).
Non-Final Office Action for U.S. Appl. No. 10/993,738 dated Jul. 16, 2009.
Official Action for U.S. Appl. No. 11/147,144 (dated Jul. 7, 2009).
Bhardwaj, "Roaming Hubbing & LTE," GSMA London, pp. 1-11 (May 19, 2009).
Matijašević et al., "Mechanisms for Diameter service performance enhancement," http://www.mrtc.mdh.se/qimpress/files/SoftCOM_DMatijasevic.pdf, pp. 1-5 (2009).
Non-Final Office Action for U.S. Appl. No. 10/993,738 dated Nov. 13, 2008.
Official Action for U.S. Appl. No. 11/147,144 (dated Nov. 13, 2008).
Tsou et al., "Diameter Routing Extensions," draft-tsou-dime-base-routing-ext-04, Internet—Draft, pp. 1-28 (dated Jul. 29, 2008).
Notification of Transmittal of the International Search Report and the Written Opinion of the International Searching Authority, or the Declaration for International Application No. PCT/US05/32070 (dated Jul. 11, 2008).
Supplementary European Search Report for European Patent Application No. 04811530.7-1249 (dated Apr. 15, 2008).
Non-Final Office Action for U.S. Appl. No. 10/993,738 dated Feb. 5, 2008.
Notification of European publication number and information on the application of Article 67(3) EPC for European Application No. 04811530.7 (dated Aug. 9, 2006).
Notification of Transmittal of the International Search Report and the Written Opinion of the International Searching Authority, or the Declaration for International Application No. PCT/US2004/38827 (dated Jul. 11, 2006).
Liu et al., "Introduction to Diameter," Developer Works http://www.ibm.com/developerworks/library/wi-diameter/index.html (Downloaded from the Internet on Aug. 2, 2011), pp. 1-9 (Jan. 24, 2006).
Eronen et al., "Diameter Extensible Authentication Protocol (EAP) Application," Network Working Group, RFC 4072, pp. 1-31 (Aug. 2005).
Zhang, "Study and Implementation of Streaming Media AAA System based on Linux," Chinese Masters Thesis, Databased Information Science and Technology, pp. 54-55, 65-66 (Jul. 15, 2005).
Calhoun et al., "Diameter Base Protocol," Network Working Group, RFC 3588, pp. 1-148 (Sep. 2003).
Sidebottom et al., "Signaling System 7 (SS7) Message Transfer Part 3 (MTP3)—User Adaptation Layer (M3UA)," RFC 3332, pp. 1-113 (Sep. 2002).
Stewart et al., "Stream Control Transmission Protocol," Network Working Group RFC 2960, pp. 1-134 (Oct. 2000).
Greene et al., "Bi-Directional Session Setup Extension to Diameter," Internet Draft <draft-greene-diameter-ss7-session-00.txt>, pbs. 1-12 (Jul. 1998).

(56) References Cited

OTHER PUBLICATIONS

Jabbari, "Routing and Congestion Control in Common Channel Signaling System No. 7", Proceedings of the IEEE, vol. 80, No. 4, pp. 607-617 (Apr. 1992).
Teichman, "Gain a Redundancy Advantage When You Migrate SS7 and Diameter Signaling to the Cloud," Sonus Networks Inc., pp. 1-3 (Oct. 20, 2017).
"Sonus Diameter Signaling Controller (DSC) and SS7 Solutions," Sonus Networks, Inc., pp. 1-5 (Aug. 22, 2017).
Notice of Allowance and Fee(s) Due for U.S. Appl. No. 13/910,091 (dated Dec. 30, 2015).
Non-Final Office Action for U.S. Appl. No. 13/910,091 (dated Sep. 3, 2015).
"SS7 Sigtran Solution Guide—Chapter 1—SS7 Basic Configurations," Cisco, pp. 1-8 (Oct. 13, 2013).
Commonly-assigned, co-pending U.S. Appl. No. 13/910,091 for "Methods, Systems, and Computer Readable Media for Load Balancing Stream Control Transmission Protocol (SCTP) Messages," (Unpublished, filed Jun. 4, 2013).
"Load Balancer Configuration Options," Atlassian Documentation, https://confluence.atlassian.com, pp. 1-2 (May 22, 2018).
Teichman, "Gain a Redundancy Advantage When You Migrate SS7 and Diameter Signaling to the Cloud," Ribbon Communications Blog, pp. 1-3 (Oct. 20, 2017).
"Sonus Diameter Signaling Controller (DSC) and SS7 Solutions," Sonus, pp. 1-5 (2017).
Barclay, "Automatic Scaling with Amazon ECS," AWS Compute Blog, pp. 1-6 (May 18, 2016).
"SS7 SIGTRAN Solution Guide," Cisco, pp. 1-8 (Oct. 31, 2013).
Stewart, "Stream Control Transmission Protocol," RFC 4960, pp. 1-153 (Sep. 2007).
Morneault et al., "Signaling System 7 (SS7) Message Transfer Part 3 (MTP3)—User Adaptation Layer (M3UA)," RFC 4666, pp. 1-125 (Sep. 2006).
Hearing Notice for Indian Patent Application Serial No. 6816/CHENP/2012 (Feb. 12, 2020).
Extended Hearing Notice for Indian Patent Application Serial No. 6918/CHENP/2012 (Oct. 12, 2020).
Commonly-assigned, co-pending U.S. Appl. No. 17/027,633 for "Methods, Systems, and Computer-Readable Media for Distributing S1 Connections to Mobility Management Entities (MMEs) and N2 Connections to Access and Mobility Management Functions (AMFs)," (Unpublished, filed Sep. 21, 2020).
Hearing Notice for Indian Patent Application U.S. Appl. No. 6918/CHENP/2012 (Sep. 14, 2020).
Hearing Notice for Indian Patent Application Serial No. 7525/CHENP/2012 (Jul. 10, 2020).

\* cited by examiner

METHODS, SYSTEMS, AND COMPUTER READABLE MEDIA FOR DISTRIBUTING SIGTRAN CONNECTIONS AMONG SIGNAL TRANSFER POINT (STP) MESSAGE PROCESSORS

TECHNICAL FIELD

The subject matter described herein relates to routing SS7 messages in Internet protocol (IP) networks. More particularly, the subject matter described herein relates to methods, systems, and computer readable media for distributing Sigtran connections among signal transfer point message processors.

BACKGROUND

Sigtran is family of protocols published by the Internet Engineering Task Force (IETF) that enables the transport of SS7 messages in IP networks. In their original standardization, SS7 messages were designed to be transported over SS7 message transfer part (MTP) layers 1-3, which are not IP-based. Sigtran transport of SS7 messages replaces one or more of the MTP layers with IP transport. Using IP transport for SS7 messages enables lower cost IP and Ethernet hardware to be used to transport SS7 messages and facilitates sharing of link bandwidth.

In SS7 networks, the signal transfer point is the routing node that routes SS7 messages to their destinations. Signal transfer points route SS7 messages based on an SS7 message parameter referred to as a point code. Because signal transfer points exclusively provide routing service in SS7 networks, signal transfer points are important functions in SS7 networks and can become overloaded with the processing required to route SS7 messages. Accordingly, it is desirable to appropriately manage the processing resources of signal transfer points.

As Sigtran is becoming widely used, there is a need for configuration flexibility as SS7 STP resources change. For example, in a cloud-based deployment where STP resources are virtualized, there may be a need to scale up and scale down virtual STP resources. Scaling up STP resources may require that IP-based connections to the STP that implement SS7 links and linksets to be added or removed. In an SS7 network, a link or signaling link is a connection between adjacent nodes. A linkset is a logical grouping of signaling links. Adding and removing links and linksets can require manual reconfiguration of the IP addresses and port numbers associated with the links and linksets. Performing such configuration manually is time and labor intensive and unsuitable for cloud-based STP deployments where resource reconfiguration flexibility is needed. Even in bare metal or on-premises deployments of STP resources, similar problems with reconfiguration may occur.

Accordingly, in light of these difficulties, there exists a need for improved methods, systems, and computer readable media for distributing Sigtran connections among STP message processors.

SUMMARY

The subject matter described herein includes methods, systems, and computer readable media for distributing Sigtran connections among STP message processors. One method for distributing Sigtran connections among STP message processors includes providing a connection load balancer as a front end to plural message processors of an STP. The method further includes publishing, by the connection load balancer, an Internet protocol (IP) address to SS7 peers. The method further includes initializing the message processors of the STP to listen on the IP address published by the connection load balancer. The method further includes receiving, at the connection load balancer, a Sigtran message addressed to the IP address. The method further includes determining, by the connection load balancer, whether the Sigtran message is an initial message for a Sigtran connection or a subsequent message on a Sigtran connection and whether the Sigtran message is for a Sigtran connection to which one of the message processors has been assigned. The method further includes forwarding the message to one of the message processors or dropping the message based on whether the message is an initial message or a subsequent message and based on whether Sigtran message is for a Sigtran connection to which one of the message processors has been assigned.

According to one aspect of the subject matter described herein, the message processors comprise physical message processors of a physical STP. Such an STP may be deployed on-premises in a telecommunications network operator's network.

According to another aspect of the subject matter described herein, the message processors comprise virtual message processors of a virtual STP. Such an STP and its message processor may be deployed in a cloud network and may comprise virtual processing resources that execute on a hypervisor layer that virtualizes access to underlying hardware.

According to yet another aspect of the subject matter described herein, the IP address published by the connection load balancer may be associated with a loopback interface of the message processors. Associating the IP address with a loopback address of the message processors enables the message processors to use the IP address as an alias without broadcasting address resolution protocol (ARP) or Internet control management protocol version 6 (ICMPv6) neighbor discovery messages containing the IP address.

According to yet another aspect of the subject matter described herein, the method for Sigtran connection load balancing includes broadcasting, by the connection load balancer, gratuitous address resolution protocol (ARP) or ICMPv6 neighbor discovery messages that associate the IP address with a medium access control (MAC) address of the connection load balancer.

According to yet another aspect of the subject matter described herein, the message is an initial message for a Sigtran connection to which one of the STP message processors has not been assigned. If the message is determined to be an initial message and the connection has not been assigned to one of the message processors, one of the message processors is assigned to the Sigtran connection for which the initial message is intended to initiate establishment using a load balancing algorithm. The Sigtran message is then forwarded to the message processor assigned to the Sigtran connection.

According to yet another aspect of the subject matter described herein, assigning one of the message processors to the Sigtran connection using a load balancing algorithm includes maintaining a group count for each of the message processors, where the group count is indicative of a number of Sigtran connections assigned to each message processor. For each message processor, a group count difference between the group count for the message processor and a lowest group count of the message processors is calculated. Message processors having a group count difference that is less than a link distribution threshold are included as connection distribution candidates. Message processors with a group count difference greater than or equal to the link distribution threshold are excluded from consideration as connection distribution candidates.

According to yet another aspect of the subject matter described herein, the method for Sigtran connection load balancing includes detecting failure and reconnection of one the message processors and, in response, use the reconnected message processor as a candidate for Sigtran connection distribution.

According to yet another aspect of the subject matter described herein, determining whether the message is an initial message or a subsequent message associated with a Sigtran connection may include determining that the message is a subsequent message. Determining whether the Sigtran connection associated with the subsequent message has been assigned to one of the message processors may include determining that the Sigtran connection has been assigned to one of the message processors. If the message is determined to be a subsequent message for which the Sigtran connection has been assigned to one of the message processors, the message may be forwarded to the assigned message processor.

According to yet another aspect of the subject matter described herein, the method for Sigtran connection load balancing includes forwarding egress traffic is forwarded from the message processors of the STP to the SS7 peers in a manner that bypasses the connection load balancer.

According to yet another aspect of the subject matter described herein, a system for distributing Sigtran connections among signal transfer point (STP) processors is provided. The system includes a signal transfer point (STP) including a plurality of message processors for routing Sigtran messages received on Sigtran connections. The system further includes a connection load balancer that operates as a front end to the message processors of the STP. The connection load balancer is configured to publish an Internet protocol (IP) address to SS7 peers. The message processors are initialized to listen on the IP address published by the connection load balancer. The connection load balancer is configured to receive a Sigtran message addressed to the IP address, determine whether the Sigtran message is an initial message for a Sigtran connection or a subsequent message for a Sigtran connection and whether the Sigtran message is for a Sigtran connection to which one of the message processors has been assigned. The connection load balancer is configured to forward, based on a result of the determining, the Sigtran message to one of the message processors.

According to yet another aspect of the subject matter described herein, the connection load balancer is configured to broadcast gratuitous ARP or ICMPv6 neighbor discovery messages that associate the IP address with a MAC address of the connection load balancer.

According to yet another aspect of the subject matter described herein, the connection load balancer determines that the message is an initial message for a Sigtran connection to which one of the message processors has not been assigned, assigns the Sigtran connection for which the initial message is intended to initiate establishment to one of the message processors using a load balancing algorithm, and forwards the Sigtran message to the message processor assigned to the Sigtran connection.

According to yet another aspect of the subject matter described herein, the connection load balancer is configured to maintain a group count for each of the message processors, where the group count is indicative of a number of Sigtran connections assigned to each message processor, and wherein the connection load balancer is further configured to calculate, for each message processor, a group count difference between the group count for the message processor and a lowest group count of the message processors, and include, as connection distribution candidates, message processors having a group count difference that is less than a link distribution threshold.

According to yet another aspect of the subject matter described herein, the connection load balancer is configured to detect failure and reconnection of one the message processors and, in response, using the reconnected message processor as a candidate for Sigtran connection distribution.

According to yet another aspect of the subject matter described herein, the message processors are configured to forward egress traffic from the STP to the SS7 peers in a manner that bypasses the connection load balancer.

According to yet another aspect of the subject matter described herein, a non-transitory computer readable medium having stored thereon executable instructions that when executed by a processor of a computer control the computer to perform steps is provided. The steps include providing a connection load balancer as a front end to plural message processors of an STP. The steps further include publishing, by the connection load balancer, an Internet protocol (IP) address to SS7 peers. The steps further include initializing the message processors of the STP to listen on the IP address published by the connection load balancer. The steps further include receiving, at the connection load balancer, a Sigtran message addressed to the IP address. The steps further include determining, by the connection load balancer, whether the Sigtran message is an initial message for a Sigtran connection or a subsequent message for a Sigtran connection. The steps further include forwarding, by the connection load balancer and based on a result of the determining, the Sigtran message to one of the message processors.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to accompanying drawings of which.

DETAILED DESCRIPTION

Figure 1:
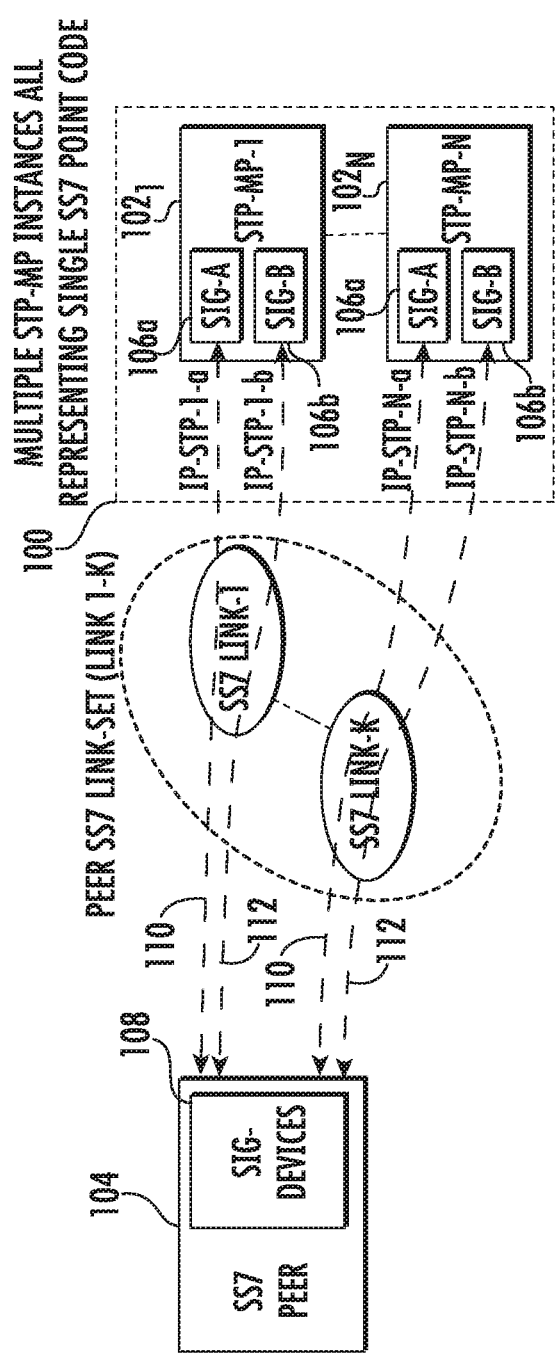
FIG. 1 is a block diagram illustrating conventional distribution of Sigtran connections to message processors of an STP.

Methods, systems, and computer readable media for distributing Sigtran connections among STP processors are disclosed. FIG. 1 illustrates a conventional system for distributing Sigtran connections among STP message processors. In FIG. 1, a signal transfer from STP 100 includes multiple message processors $102_1$-$102_N$. Each message processor $102_1$-$102_N$ has dedicated connections, referred to as links, to external devices, such as SS7 peer 104. In the illustrated example, the SS7 links are numbered 1-K. Links 1-K form a logical grouping, referred to as a linkset. The message processors represent a single SS7 point code. Each of the message processors $102_1$-$102_N$ has two Ethernet devices 106a and 106b. Multi-homed stream control transmission protocol (SCTP) associations 110 and 112 are established between the message processors of STP 100 and signaling devices 108 of SS7 peer 104. A multi-homed SCTP association is a connection between processes where the process at each endpoint has more than one IP address. In the illustrated example, the IP addresses IP-STP-1-a and IP-STP-N-a are IP addresses associated with one end of path "a" of a multi-homed STP association. Similarly, IP addresses IP-STP-1-b and IP-STP-N-b are IP addresses associated with one end of path "b" of a multi-homed SCTP association. The IP addresses IP-STP-1-a, IP-STP-N-a, IP-STP-1b, and IP-STP-N-b are published to SS7 peer 104. As a result, when one of message processors $102_1$-$102_N$ fails, or a new message processor is added, reconfiguration of SS7 peer 104 is required.

Multi-homed SCTP associations 110 and 112 each have endpoints on two different message processors of STP 100. Accordingly, when one of message processors $102_1$-$102_N$ fails, traffic can be automatically switched to the other message processor associated with the multi-homed connection or association. However, the remaining path of the SCTP association will operate at reduced capacity. When a message processor becomes available, either after failure or during a scale up operation, new links have to be configured with an IP address for the new message processor. Such configuration can be labor or processor intensive for remote STP peers.

Figure 2:
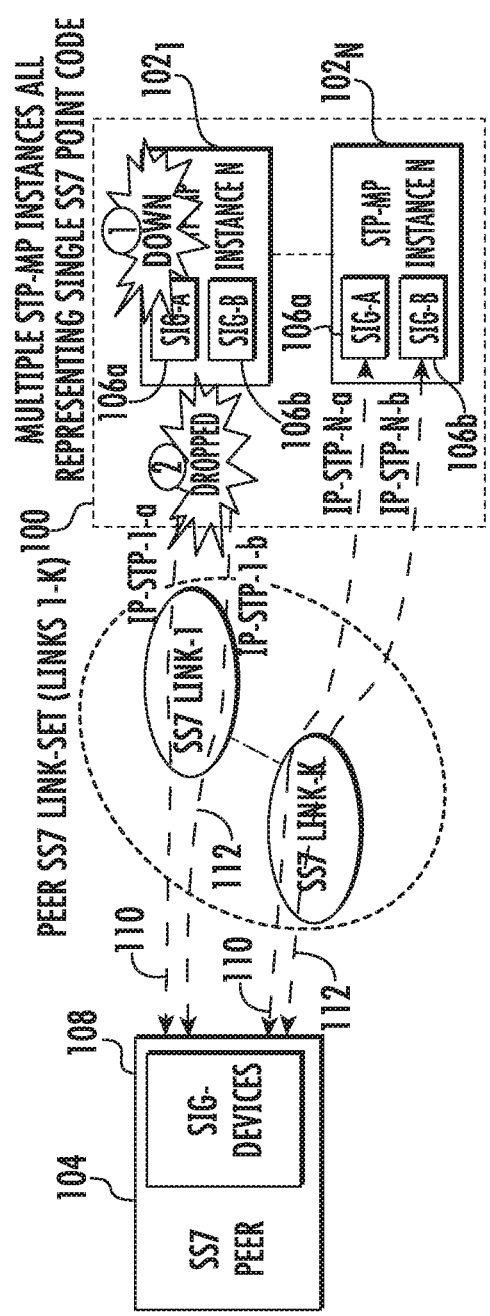
FIG. 2 is a network diagram illustrating conventional distribution of Sigtran connections among message processors at an STP when a message processor goes down.

FIG. 2 illustrates a process that occurs when one of the message processor fails. In FIG. 2, in step 1, message processor $102_1$ fails. In step 2, all of the links connected to message processor $102_1$ are dropped. Reconnection attempts to message processor $102_1$, also fail. For remote peer nodes connected to STP 100, links may be on a single message processor or distributed across multiple message processors based on a redundancy mode. When the failure occurs, SS7 peer 104 attempts to reconfigure the affected links with fixed IPs of another message processor, which can be labor intensive.

Another issue with the scenario illustrated in FIG. 2 is that automatic connection distribution to the least loaded message processor may not be possible. For example, if message processor $102_1$ is loaded disproportionately with Sigtran connections load balancing may not be possible because SS7 peer 104 does not know the relative loading of message processors $102_1$-$102_N$. Another issue with the scenario illustrated in FIG. 2 is that when an STP message processor goes down, links connected to the failed message processor are not automatically distributed to other STP message processors, leaving the linkset operating with reduced capacity unless manual intervention is performed to reconfigure links with other STP message processors. As described above, using multi-homed Sigtran connections, when the message processor associated with one path fails, messages may be transmitted to the STP over the alternate link associated with the multi-homed Sigtran connections. However, as illustrated in FIG. 2, when one message processor fails, half of the signaling links associated with a linkset fails, which reduces the capacity of the linkset. In light of these difficulties, there exists a need for improved distribution of Sigtran connections among message processors at a signal transfer point.

Figure 3:
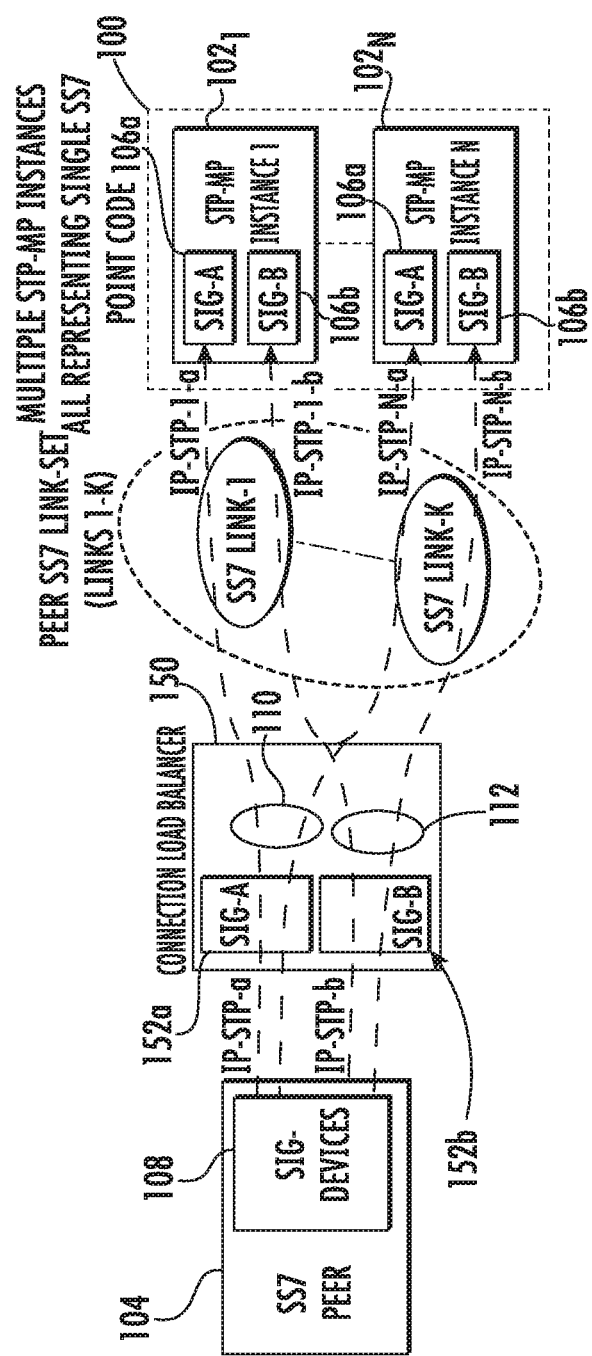
FIG. 3 is a network diagram illustrating distribution of Sigtran connections among message processors at an STP using a connection load balancer.

FIG. 3 is a network diagram illustrating distribution of Sigtran connections at an STP using a connection load balancer. Referring to FIG. 3, a connection load balancer 150 functions as a front end to message processors $102_1$-$102_N$ of STP 100. Connection load balancer 150 publishes an IP address on each network to SS7 peer 104. In the illustrated example, the IP addresses that are published are IP-STP-a for network A and IP-STP-b for network B. These IP addresses are public IP addresses that connection load balancer 150 recognizes for messages that need to be distributed among message processors of STP 100. Connection load balancer 150 includes Ethernet interfaces 152A and 152B. Publishing the IP addresses may include broadcasting gratuitous ARP messages to SS7 peer 104 that associate the IP addresses IP-STP-a and IP-STP-b with the MAC addresses of Ethernet interfaces 152A and 152B. Gratuitous ARP messages may be used to publish the IP addresses used by the connection load balancer for load sharing among STP processors if IP version 4 is being used in the network. If IP version 6 is being used, rather than broadcasting gratuitous ARP messages, ICMPv6 neighbor discovery messages may be used to broadcast the IP addresses and corresponding MAC addresses to SS7 peers. Typically, the IP addresses would be published to a border gateway adjacent to connection load balancer 150, and the border gateway would communicate the IP addresses to other SS7 nodes using border gateway protocol (BGP) or other suitable IP route discovery mechanism.

As with the examples illustrated in FIGS. 1 and 2, multi-homed SCTP associations may be established between SS7 peer 104 and message processors 102₁ and 102_N. SS7 traffic may be transmitted to and from STP 100 over the multi-homed SCTP associations using an adaptation layer protocol, such as M3UA.

Even though the example illustrated in FIG. 3 illustrates multi-homed SCTP associations between SS7 peer 104 and message processors 102₁-102_N, the subject matter described herein is not limited to such an implementation. Connection load balancer 150 may be used to load balance connections among uni-homed SCTP associations, i.e., those with only a single IP address associated with each endpoint, between SS7 peers and STP message processors.

As used herein, the term "Sigtran connection" will be used to refer to a connection established between SS7 endpoints over an IP network to carry Sigtran traffic. An example of a Sigtran connection is an SCTP association.

Each message processor 102₁-102_N also configures itself to listen to the IP addresses published by connection load balancer 150. For example, message processor 102₁ may listen on IP addresses IP-STP-a and IP-STP-b. Configuring a message processor to listen may include executing sockets a listen command on a given IP address and port.

Connection load balancer 150 addresses at least some of the problems described above. By exposing only one set of public IP addresses used to connect to STP message processors and continuing to use the same set of IP addresses despite message processors being taken into and out of service, changes in STP message processors will not require manual reconfiguration of links and linksets. STP 100 can scale up or scale down without changing the public IP address information. Changes in configuration will be transparent to SS7 peers 104 because new message processors will use IP addresses from the existing set of IP addresses published by connection load balancer 150. In FIG. 3, connection load balancer 150 only exposes IP addresses IP-STP-a and IP-STP-b to SS7 peer 104. STP message processors 102₁-102_N each recognize the set of IP addresses published by connection load balancer 150. New physical or virtual message processors will be configured to recognize the same set of IP addresses. As a result, when message processors are added or removed from service, such a change in configuration is transparent to SS7 peer 104.

Connection load balancer 150 may also balance Sigtran connections among SS7 message processors 102₁-102_N. If message processing capacity at STP 100 is lost or decreases, connection load balancer 150 may redistribute links among available SS7 message processors and thereby avoids service disruption with remote SS7 peer 104. Similarly, if processing capacity is added at STP 100, connection load balancer 150 may rebalance Sigtran connections among available message processors in a manner that is transparent to remote SS7 peers.

FIG. 3 can also be used to illustrate the routing of ingress traffic using connection load balancer 150. In FIG. 3, traffic from signaling devices 108 on SS7 peer 104 is addressed to the public IP addresses IP-STP-a or IP-STP-b published by connection load balancer 150. Connection load balancer 150 receives the message traffic and determines whether, for each message, the message is an initial message associated with a Sigtran connection or a subsequent message associated with a Sigtran connection. An initial message is a connection request message for which a message processor has not been assigned. For an SCTP association, an example of an initial message is an SCTP INIT message. In the SCTP protocol, an INIT message is the message used to initiate establishment of an SCTP association with a remote endpoint. The INIT message carries a list of IP addresses associated with the endpoint sending the INIT message.

A subsequent message is a message, such as an SCTP cookie-echo message, selective acknowledgement (SACK), heartbeat, heartbeat ACK or a data message, that is sent after an initial message for an SCTP association. If the message is determined to be and initial message, connection load balancer 150 may assign the message to one of message processors 102₁-102_N using a load balancing algorithm, which will be described in detail below. If the message is determined to be a subsequent message associated with a Sigtran connection, connection load balancer 150 will route the message to the message processor 102₁-102_N previously assigned to the Sigtran connection. If the message is a subsequent message and no message processor has been assigned to the Sigtran connection, connection load balancer 150 may drop the message.

Figure 4:
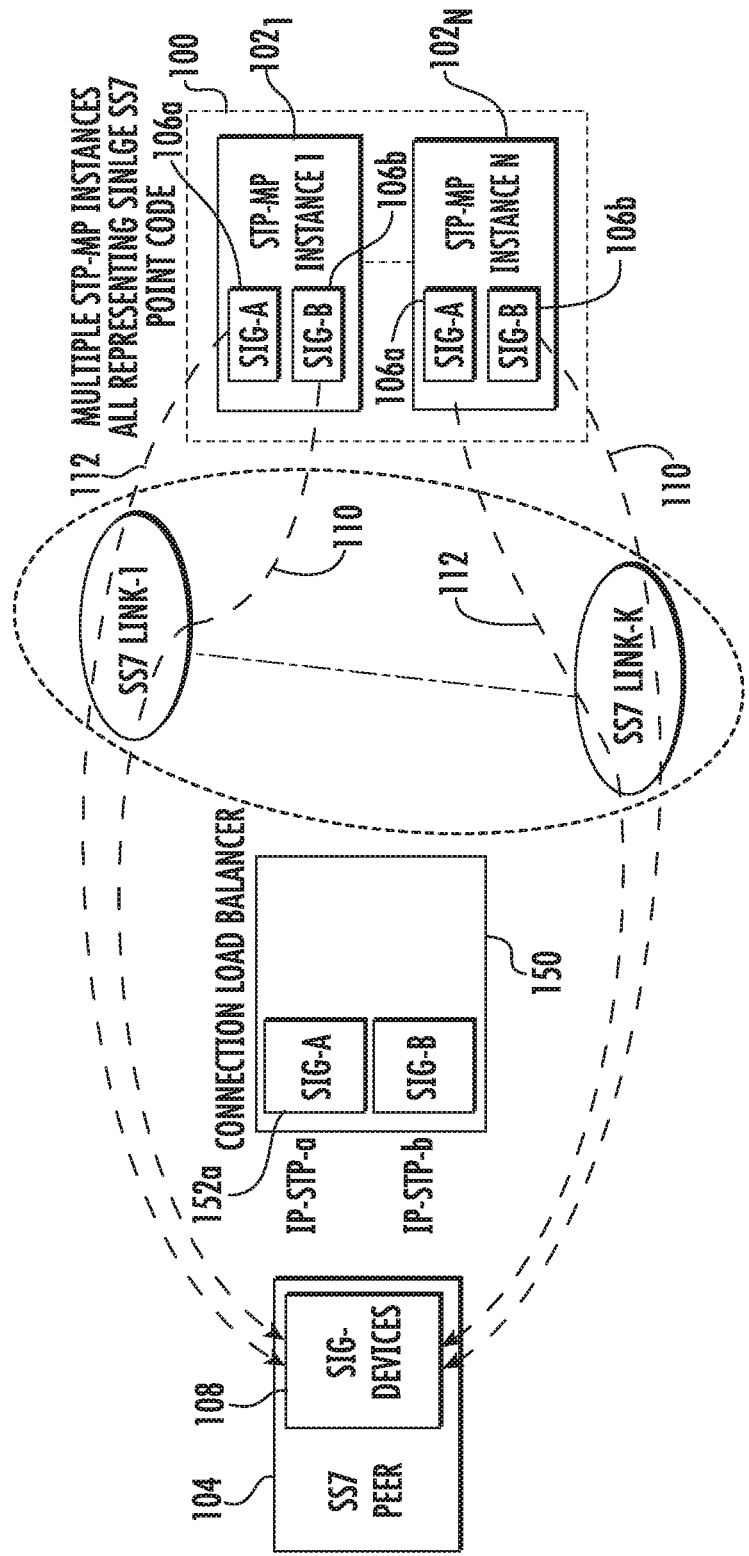
FIG. 4 is a network diagram illustrating routing of egress traffic from an STP in a manner that bypasses the connection load balancer.

FIG. 4 is a diagram illustrating the flow of egress message traffic from STP 100 to remote SS7 peer 104. Referring to FIG. 4, egress traffic from message processors 102₁-102_N is not routed through connection load balancer 150 and thus does not affect the capacity of connection load balancer 150. The mechanism by which traffic is routed around connection load balancer 150 includes IP routing protocols where routing paths from STP 100 to signaling devices 108 are determined using standard routing information protocols, such as routing information protocol (RIP) or open shortest path first (OSPF). Such paths may not include connection load balancer 150. Since gratuitous ARP or ICMPv6 neighbor discovery messages are broadcast for the public IP address used by the connection load balancer, ingress messages (i.e., messages from an SS7 peer to one of the STP message processors) addressed to the public IP address are routed through the connection load balancer. Egress messages are not addressed to the public IP address of the connection load balancer. Rather, they are addressed to the IP address of the destination SS7 peer. As stated above, the route to the SS7 peer may not include connection load balancer 150, and thus egress messages (i.e., messages from an STP message processor to an SS7 peer at the other end of an SCTP association) may be routed over routes determined using RIP or OSPF, which bypass connection load balancer 150.

Figure 5:
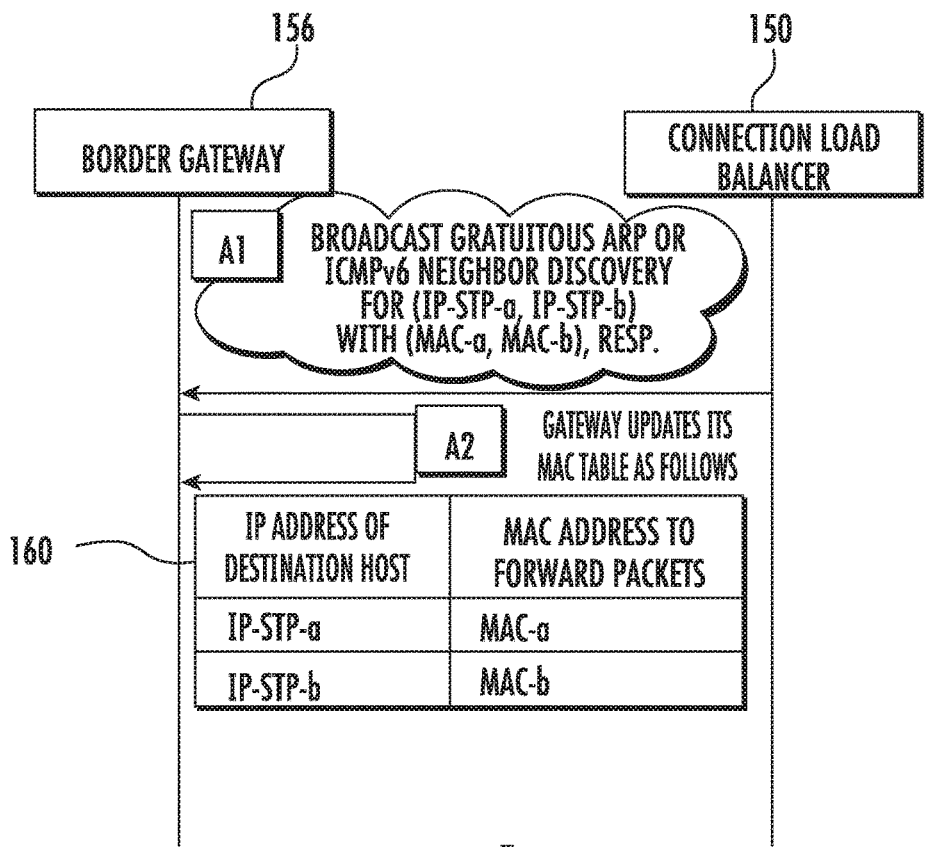
FIG. 5 is a message flow diagram illustrating connection load balancer initialization.
Figure 6:
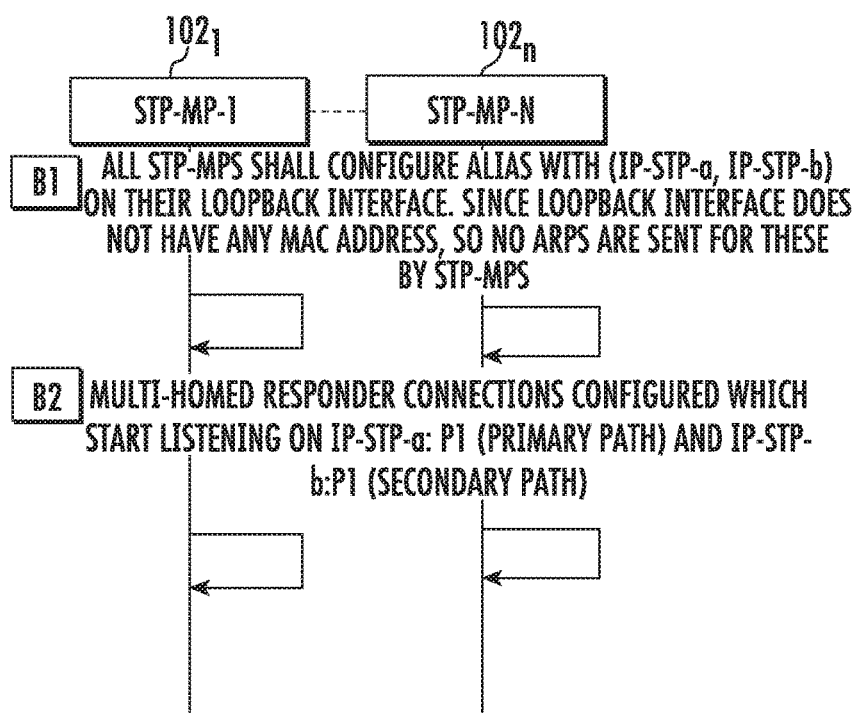
FIG. 6 is a message flow diagram illustrating STP message processor initialization.

FIGS. 5 and 6 illustrate connection load balancer initialization. Referring to FIG. 5, in step A1 connection load balancer 150 publishes IP addresses for each network on which connection load balancer is present to an SS7 peer, which in the illustrated example is border gateway 156. The publishing of the IP addresses may be accomplished by broadcasting gratuitous ARP or ICMPv6 neighbor discovery messages associating IP address IP-STP-a with MAC address MAC-a and IP address IP-STP-b with MAC address MAC-b. In step A2, border gateway 156 updates its MAC or ARP table to associate the IP addresses with the MAC addresses. Table 160 illustrates and example of the configuration of the ARP table of border gateway 156 after receiving the gratuitous ARP message from connection load balancer 150.

FIG. 6 is a flow diagram illustrating initialization of the message processors. Referring to FIG. 6, in step B1, all of the message processors configure an alias address of the IP address IP-STP-a and IP-STP-b published by connection load balancer 150 on the loopback interface. The IP addresses are configured on the loopback interface of each message processor 102₁-102_N so that message processors 102₁-102_N do not send ARP or ICMP messages for these IP addresses. In step B2, each message processor 102₁-102_N configures multi-homed responder connections which start listening on IP address IP-STP-a for the primary path and IP address IP-STP-b for the secondary path.

Figure 7:
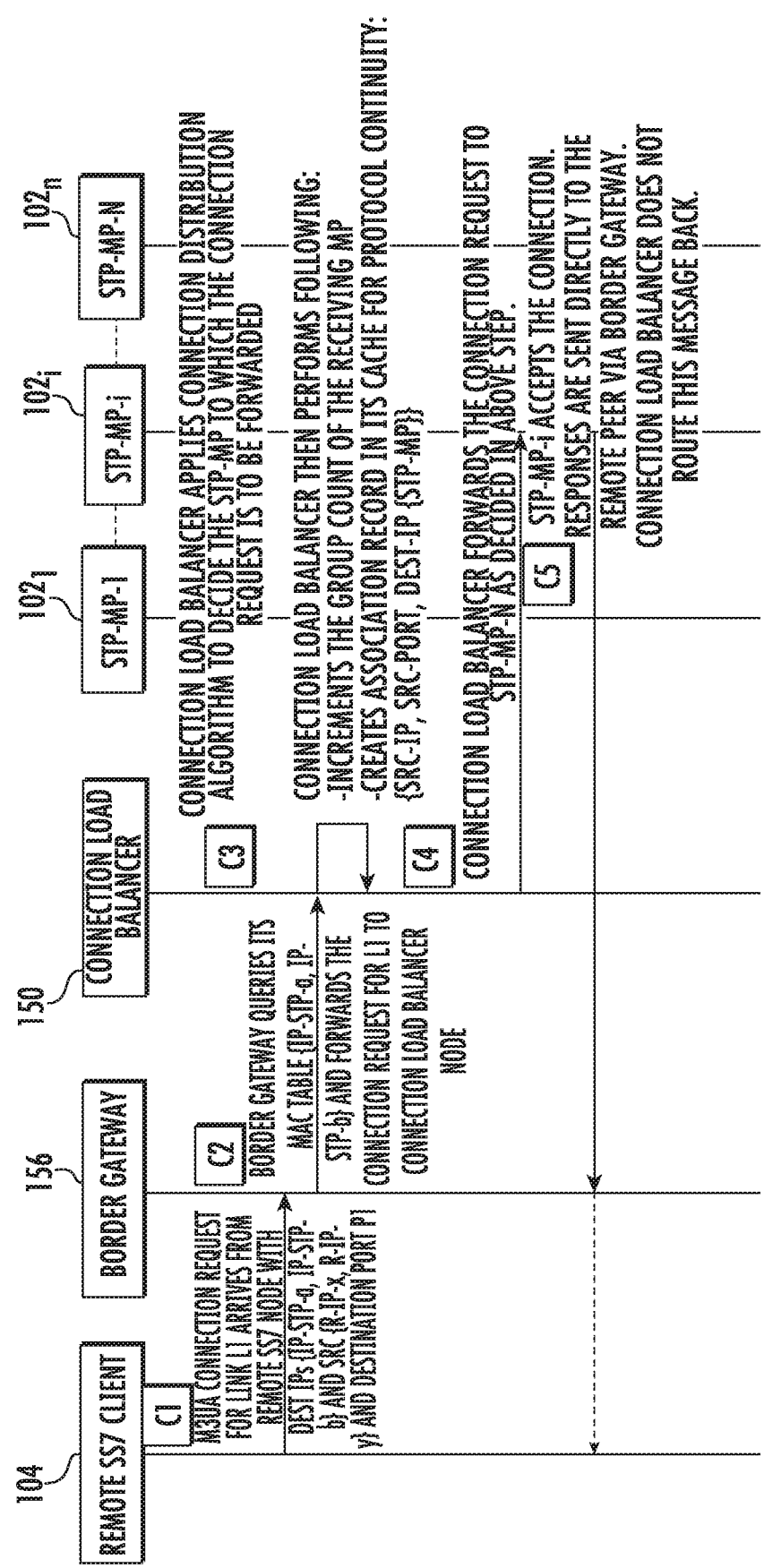
FIG. 7 is a message flow diagram illustrating distribution of Sigtran connections among STP message processors using a connection load balancer.

After initialization, Sigtran connections can be distributed among processors at STP 100 using a load balancing algorithm. FIG. 7 is a message flow diagram illustrating the distribution of new Sigtran connections to SS7 message processors using connection load balancer 150. FIG. 7 Referring to FIG. 7, in step C1, a remote SS7 client 104 sends a Sigtran connection request on link L1. The destination IP addresses for the connection request include IP addresses IP-STP-a and IP-STP-b. The source IP address in this example is R-IP-x and R-IP-y. The destination port for the connection request is P1.

In step C2, border gateway 156 queries its MAC table for the MAC address corresponding to IP address IP-STP-a. In this example, border gateway 156 locates the address MAC-a, which corresponds to an interface of connection load balancer 150. Accordingly, border gateway 156 forwards the message to connection load balancer 150.

In step C3, connection load balancer 150 applies a connection distribution or load balancing algorithm to determine which STP message processor should receive the connection request. In this example, it is assumed that message is sent, as a result of the load balancing algorithm, to message processor $102_i$. In one example, connection load balancer 150 may perform load balancing based on the following parameters in the algorithm. For each message processor, the connection load balancer 150 may maintain a group count. A group count represents the number of links from a remote peer that land on a given message processor. Initially, the group count will be set to 0 for all message processors. Each time a new Sigtran connection is assigned to a message processor, the group count is incremented. Another parameter that may be used in the load balancing algorithm is the link distribution threshold, which is valid across a linkset. The link distribution threshold is configurable value set by the user to define a threshold difference between group counts above which a message processor will not be considered for load balancing. For example, the link distribution threshold may be set to 4. When connection load balancer 150 receives a new Sigtran connection request, connection load balancer 150 determines the group count of each message processor $102_1$, $102_i$, and $102_N$. Connection load balancer 150 then identifies the message processor with the lowest group count and adds the link distribution threshold to the lowest group count. Any message processor having a group count that is greater than the sum of the lowest group count and link distribution threshold will not be considered for load balancing. Any message processor having a group count that is less than the sum of the lowest group count and the link distribution threshold will be considered as a connection distribution candidate. For example, if the group counts of message processors $102_1$, $102_i$, and $102_N$ are 1, 3, and 4, respectively, and the link distribution threshold value is 2, then only the message processors $102_1$ and $102_i$ will be considered as candidates for connection distribution.

Once the group of candidates for connection distribution is identified, connection load balancer 150 may select from one of the candidates, e.g., using a random selection algorithm, and forward the connection request to the assigned message processor (see step C4). Connection load balancer 150 may also create an entry in its association database that associates the Sigtran connection with the assigned message processor. An example of parameters that may be stored in the association database is as follows:

{R-IP-x, R-IP-y, R-Port→STP-MP-i}

In this example, R-IP-x and R-IP-y are IP addresses of the SS7 peer that sends an SCTP INIT message to connection load balancer 150. More than one IP address may be used for a single peer because the peer implements SCTP multi-homing. R-Port is the SCTP port number used by the sending node in the SCTP INIT message. STP-MP-i is an identifier used by connection load balancer 150 for the STP message processor assigned to the connection.

After a record such as that illustrated above is created by connection load balancer 150, subsequent messages, such as SCTP data or control messages sent over the same SCTP association, will be forwarded to the same STP message processor. For example, when an SCTP data or control message (also referred to as "chunks") arrives at connection load balancer 150, connection load balancer 150 may perform a lookup in its association database using the source IP addresses and SCTP port number in the message. In this example, it is assumed that the source IP addresses are R-IP-x and R-IP-y and the source port is R-Port. Accordingly, connection load balancer 150 will locate the matching entry from the example above and forward the SCTP data message to the assigned STP message processor STP-MP-i.

It should also be noted that if an SCTP INIT message is received a connection load balancer 150 and a connection has already been established with one of the STP message processors, connection load balancer 150 will forward the message to the assigned message STP message processor. The SCTP association state machine on the assigned message processor will handle out of state messages, such as INIT messages for which a connection has already been established. Continuing with the above example, if an SCTP INIT message is received with source IP addresses R-IP-x and R-IP-y and a source SCTP port of R-Port, and connection load balancer locates a matching entry in its association database, connection load balancer 150 will forward the INIT message to the assigned message processor. The assigned message processor may receive the INIT message, and depending on the current state of the SCTP association state machine, process or drop the INIT message.

Returning to FIG. 7, in step C5, the assigned message processor accepts the connection and sends the response directly to the remote peer via border gateway 156. Connection load balancer 150 is not in the path for the egress messages.

Figure 8:
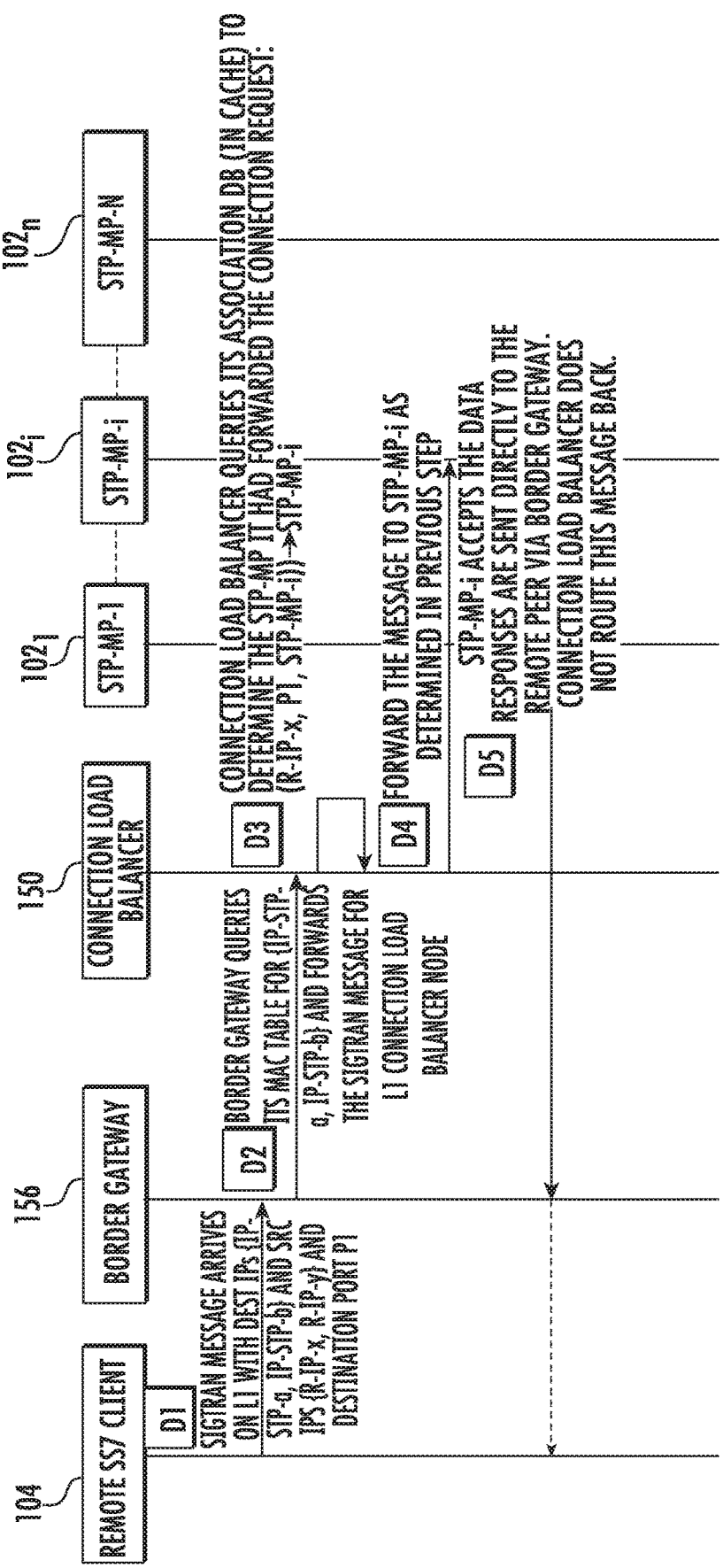
FIG. 8 is a message flow diagram illustrating processing of messages associated with existing Sigtran connections at an STP using a connection load balancer.

FIG. 8 is a message flow diagram illustrating the processing of subsequent messages by connection load balancer 150. As stated above, the term "subsequent messages" refers to messages other than connection establishment messages. Referring to FIG. 8, in step D1, a Sigtran message arrives at border gateway 156 from remote client 104. The Sigtran message arrives on link L1 with destination IP addresses IP-STP-a and IP-STP-b, source IP addresses R-IP-x and R-IP-y, and destination port P1.

In step D2, border gateway 156 queries its MAC table using the IP addresses IP-STP-a and IP-STP-b from message and identifies the MAC addresses from connection load balancer 150. Border gateway 156, in step D2, forwards the Sigtran message to connection load balancer 150.

In step D3, connection load balancer 150 queries its association database to determine whether the received message is associated with Sigtran connection that has already been assigned to a message processor of STP 100. As stated above, the association database is to a database maintained by connection load balancer 150 to keep track of assignments of Sigtran connections (SCTP associations) to STP message processors. Parameters used in the association database to associate a Sigtran connection with a message processor may include source IP addresses and source ports. In this example, it is determined that messages with remote IP address R-IP-x on port P1 are associated with STP message processor STP-MP-i. In step D4, connection load balancer 150 forwards the message to message processor STP-MP-i. In step D5, message processor STP-MP-i accepts the data (or other subsequent) message and sends responses directly to the remote peer over the same SCTP association via the border gateway without passing through connection load balancer 150. Subsequent messages received by connection load balancer 150 for which no association entry is found in the association database are dropped.

Figure 9:
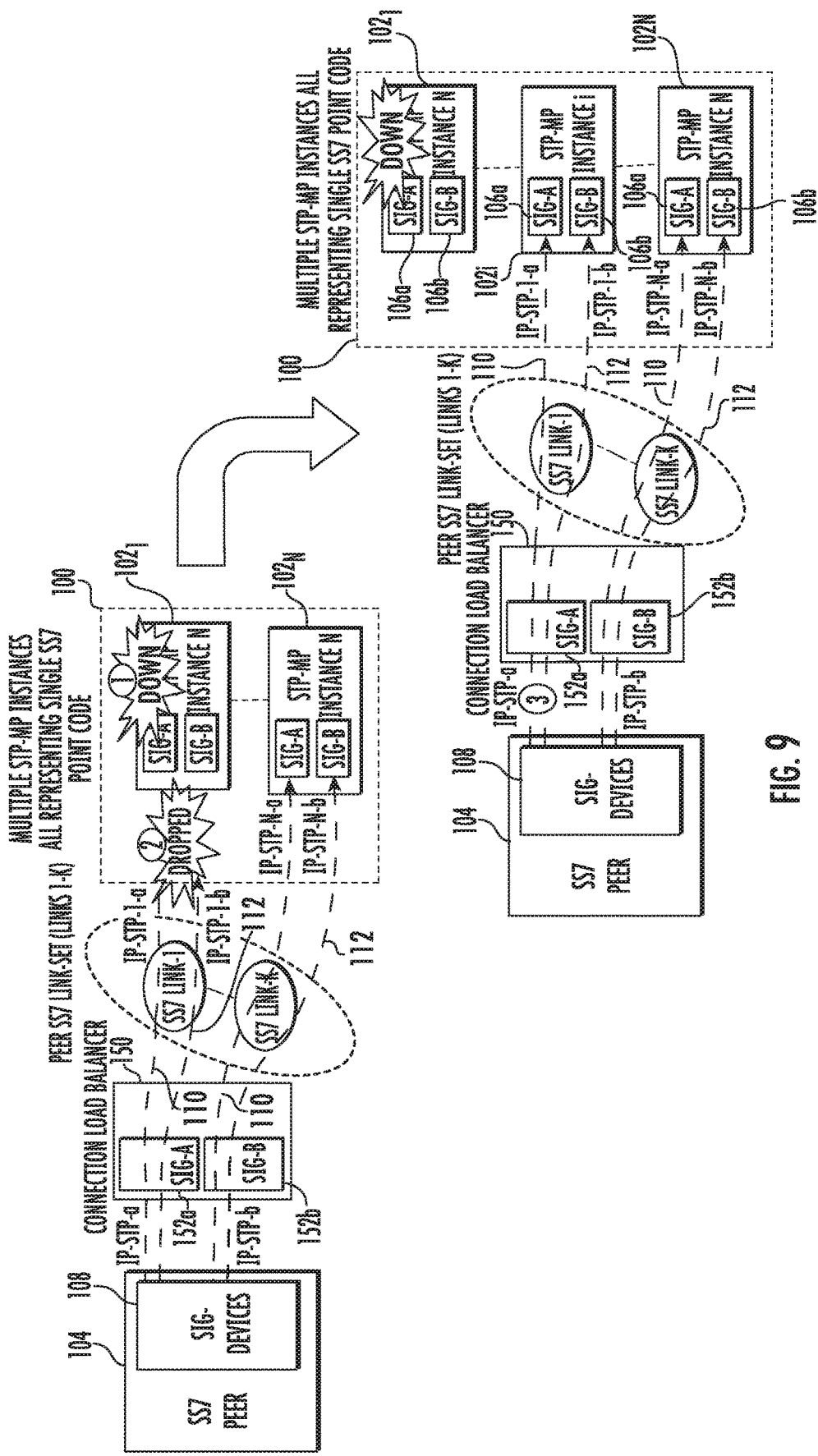
FIG. 9 is a network diagram illustrating routing of messages using a connection load balancer after reconnection of a failed message processor.

FIG. 9 is a network diagram illustrating operations performed by a connection load balancer after reconnection of an SS7 message processor. Referring to FIG. 9, in step 1, a message processor of STP 100 goes down. In step 2, SS7 links connected to the failed message processor also go down. In step 3, remote SS7 peer 104 attempts a reconnection of link 1. The reconnection is performed using the same IP addresses used by the failed message processor. Connection load balancer 150 reroutes the connection request to one of the available message processors based on the connection distribution algorithm described above.

Figure 10:
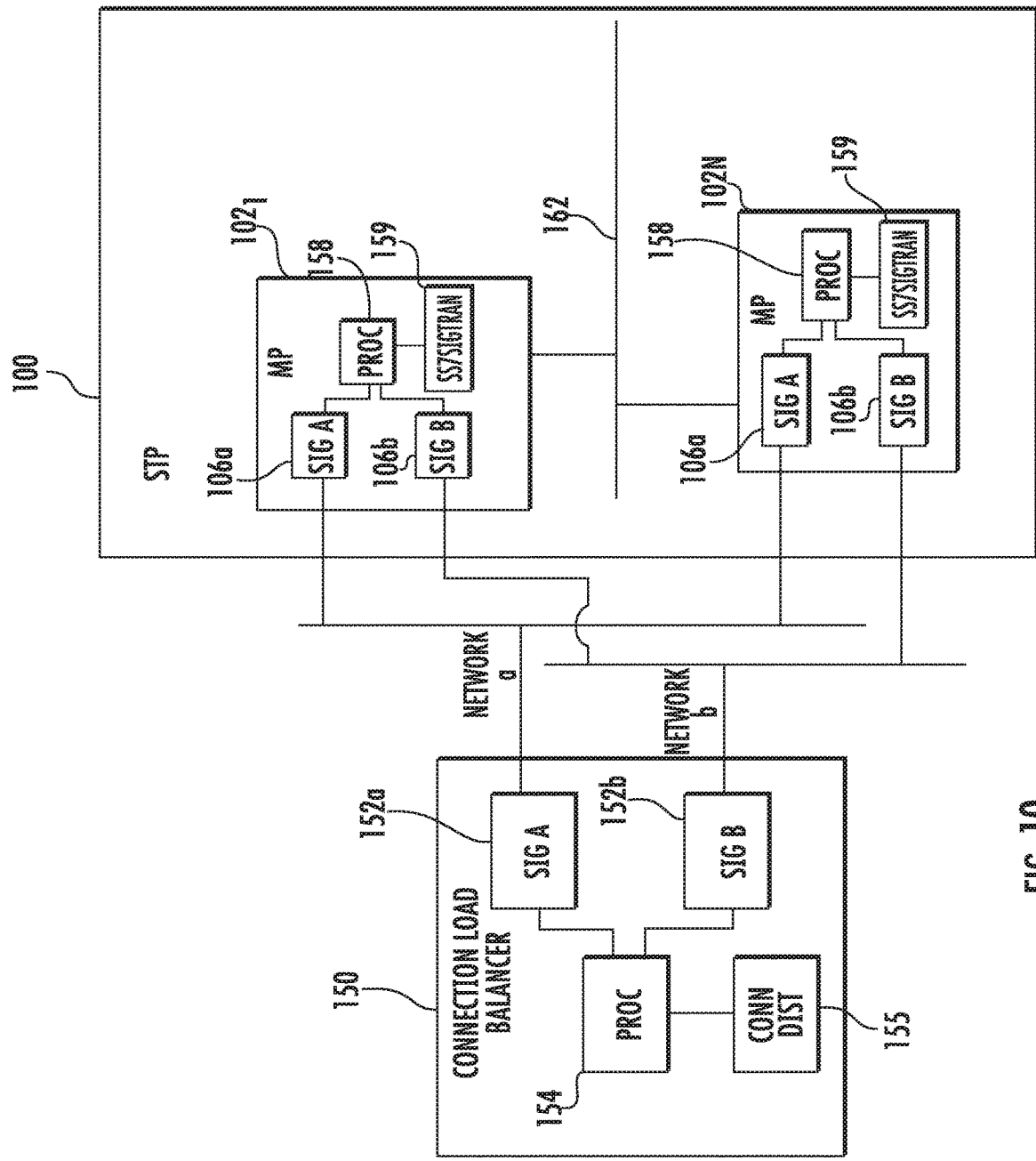
FIG. 10 is a block diagram of a connection load balancer and a signal transfer point including multiple message processors.

FIG. 10 is a block diagram of connection load balancer 150 and STP 100. Referring to FIG. 10, connection load balancer 150 includes Ethernet interfaces 152A and 152B for networks A and B, respectively. Connection load balancer also includes at least one processor 154. A Sigtran connection distributor 155 may execute on processor 154 to perform the steps described herein for distributing Sigtran connections among message processors $102_1$-$102_N$ of STP 100.

STP 100 includes message processors $102_1$-$102_N$. Each message processor includes Ethernet interfaces 106A and 106B respectively connecting to networks a and b. Each message processor $102_1$-$102_N$ may also include a processor 158 and an SS7/Sigtran function 159. SS7/Sigtran function 159 may perform SS7 functions, such as routing messages based on point codes and Sigtran functions, such as setting up multi-homed SCTP associations with remote peers. Each message processor $102_1$-$102_N$ may be a physical message processor or a virtual message processor. As physical message processors, each message processor $102_1$-$102_N$ may be a printed circuit board that is connected to other printed circuit boards in STP 100 through a communications medium 162, such as a bus or backplane. As virtual entities, each message processor $102_1$-$102_N$ may represent a virtual machine that runs on a hypervisor on cloud computing hardware. Thus, the subject matter described herein includes distributing connections among real or virtual message processors in a real or virtual STP.

Figure 11:
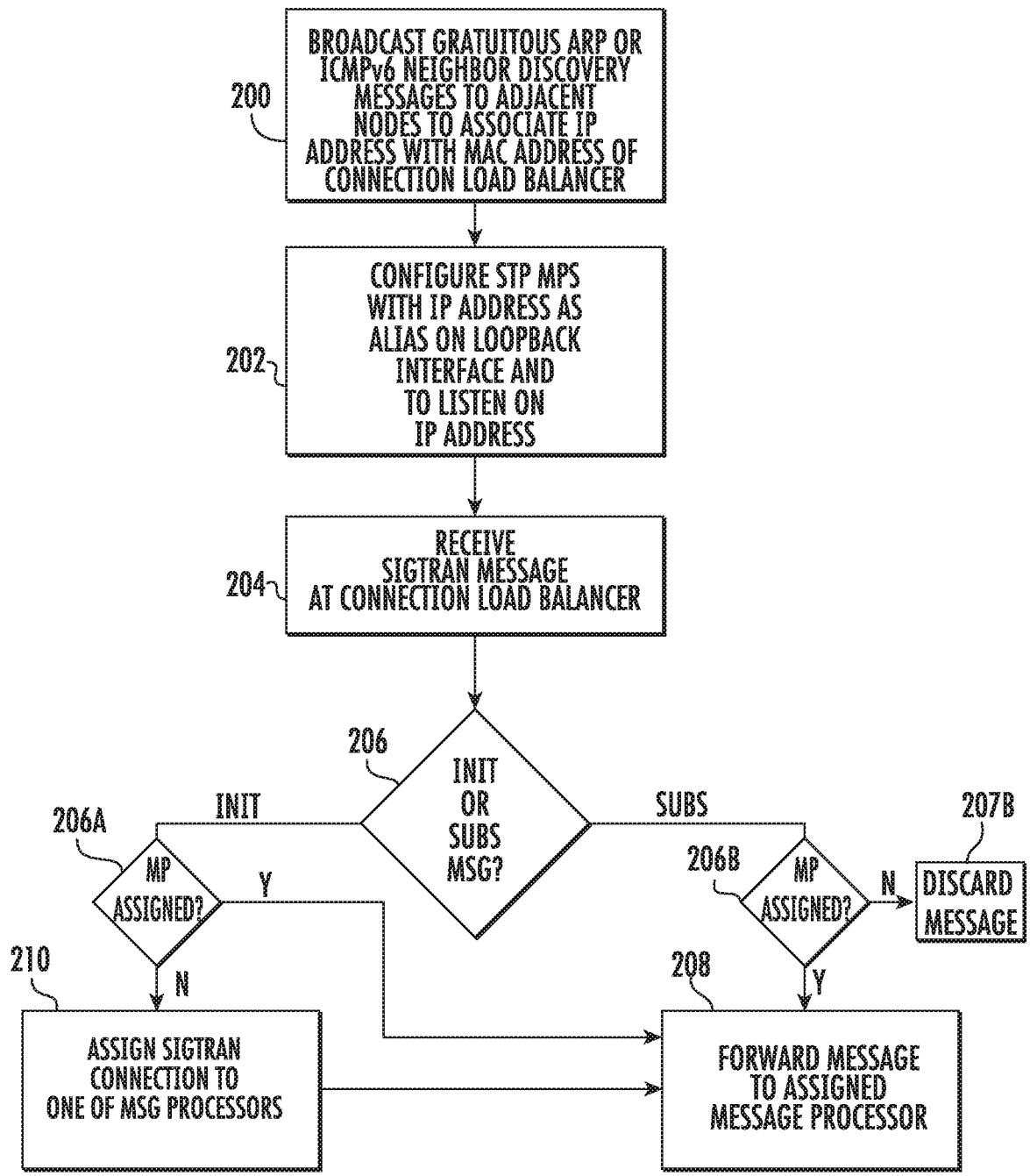
FIG. 11 is a flow chart illustrating an exemplary process for distributing Sigtran messages among STP message processors using a connection load balancer.

FIG. 11 is a flow chart illustrating an exemplary process for distributing Sigtran connections among STP message processors. Referring to FIG. 11, in step 200, the connection load balancer publishes its IP address that it uses for connection load balancing to remote peers. This step may be performed by broadcasting gratuitous ARP messages to associate the IP addresses for load balancing with MAC addresses of the connection load balancer. If IPv6 is used, step 200 may be performed by broadcasting ICMPv6 neighbor discovery messages to adjacent nodes.

In step 202, message processors of the STP are configured with the IP addresses as an alias on the loopback interface. The message processors are also configured to listen on the IP addresses. The loopback interface is used so that the message processors will not broadcast ICMPv6 neighbor discovery or ARP messages concerning the IP addresses.

In step 204, a Sigtran message is received at the connection load balancer. The Sigtran message may be an SCTP message, such as an SCTP control or data chunk. The SCTP message may carry an SS7 over M3UA payload or other SS7 over Sigtran payload.

In step 206, it is determined whether the message is an initial message or a subsequent message. Determining whether the message is an initial message or a subsequent message may include examining the SCTP chunk type field of the message. The chunk type field carries a code that identifies the type of SCTP message. The value 0x01 indicates that the chunk type is INIT or initiation. The chunk type 0x00 indicates that the chunk type is data, or that the message carries data for the applications using the SCTP connection. Other chunk types of interest may include 0x0a, identifying a cookie echo message, which is part of the handshake procedure for establishing an SCTP association.

If the message is determined to an initial message in step 206, control proceeds to step 206A, where it is determined whether a message processor has been assigned to the connection. Determining whether a message processor has been assigned to the connection may include querying the association database maintained by connection load balancer 150 using the source IP addresses and source SCTP port in the message. If a matching record is located in the association database, then it is determined that a message processor has been assigned to the connection. If a record is not located in the association database, then it is determined that a message processor has not been assigned to the connection.

If the message is an initial message and a message processor has been assigned to the connection, control proceeds to step 208 where the message is forwarded to the message processor assigned to the connection. The SCTP association state machine on the assigned message processor will handle out of state messages, such as an INIT message for which a connection has already been established. If the message is an initial message and a message processor has not been assigned to the connection, control proceeds to step 210 where the Sigtran connection for which the initial message is intended to initiate establishment is assigned to one of the message processors and results in SCTP/Sigtran connection establishment between the assigned message processor and the remote SS7 peer. SCTP connection establishment involves the sending of an INIT acknowledgment message from the assigned message processor to the SS7 peer. The SS7 peer then sends a cookie-echo message to the assigned message processor via the connection load balancer. The connection load balancer treats the cookie-echo, data, and other non-INIT messages received from the SS7 peer over the SCTP association as subsequent messages for the SCTP association.

Assigning the Sigtran connection to one of the message processors may include applying the load balancing algorithm described above to identify connection distribution candidates based on group counts which indicate relative loading of the message processors with Sigtran connections, and then selecting one of the connection distribution candidates using a selection algorithm. Because the load balancing algorithm identifies connection distribution candidates with similar Sigtran connection loadings, the selection algorithm may be any suitable selection algorithm, such as random selection, round robin selection, etc. Once a message processor is selected, the final step associated with assigning the Sigtran connection to the message processor includes creating a record in the association database maintained by connection load balancer 150 that associates the source IP addresses and source SCTP port number from the message with the assigned STP message processor. After the connection is assigned to one of the STP message processors, control proceeds to step 210 where the message is forwarded to the assigned message processor.

Returning to step 206, if the message is determined to be a subsequent message, control proceeds to step 206B where it is determined whether a message processor has been assigned to the Sigtran connection with which the subsequent message is associated. As stated above, examples of subsequent messages include SCTP data and control messages (other than INIT messages). Determining whether a message processor has been assigned to the subsequent message may includes performing a lookup in the association database maintained by connection load balancer 150 using the source IP addresses and source SCTP port number in the message. If a match is located in the database, the connection may be determined to be assigned to one of the message processors. If a match is not located in the association database, the connection may be determined not to be assigned to one of the message processors.

If the message is a subsequent message for a Sigtran connection for which no STP message processor has been assigned, control proceeds to step 207B where the message is discarded. If the message is a subsequent message for a Sigtran connection for which a message processor has been assigned, control proceeds to step 210 where the message is forwarded to the message processor previously assigned to the Sigtran connection.

Thus, using the steps described herein, real and virtual STP message processors can be seamlessly added to or removed from a network without requiring remote nodes to be reconfigured with new IP addresses. The connection load balancer also balances loading of message processors in the STP. The subject matter described herein can be used to distribute messages among real or virtual STP message processors.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for distributing Sigtran connections among signal transfer point (STP) message processors, the method comprising:
    providing an STP including a plurality of message processors, wherein the message processors are STP message processors that route Sigtran messages received on Sigtran connections from remote SS7 peers;
    providing a connection load balancer separate from the STP as a front end to the STP message processors of the STP for load balancing Sigtran connections among the STP message processors in a manner that is transparent to the remote SS7 peers, wherein the Sigtran connections are Internet-protocol (IP)-based connections between the remote SS7 peers and the STP message processors over an IP network, and the connection load balancer is configured to transparently re-distribute the IP-based connections among the STP message processors in response to changes in operational status of the STP message processors without requiring reconfiguration of the remote SS7 peers;
    publishing, by the connection load balancer, an IP address to the remote SS7 peers, wherein publishing the IP address to the remote SS7 peers includes broadcasting, by the connection load balancer, gratuitous address resolution protocol (ARP) or Internet control management protocol version 6 (ICMPv6) neighbor discovery messages that associate the IP address with a medium access control (MAC) address of the connection load balancer;
    initializing the STP message processors of the STP to listen on the IP address published by the connection load balancer;
    receiving, at the connection load balancer, a Sigtran message addressed to the IP address and transmitted by one of the remote SS7 peers in response to failure of one of the STP message processors to reconnect a link formerly connected to the failed STP message processor;
    determining, by the connection load balancer that the Sigtran message is an initial message for establishing a Sigtran connection;
    assigning, to the Sigtran connection and based on results of a Sigtran connection distribution algorithm, one of the STP message processors available to handle the Sigtran connection and forwarding the Sigtran message to the available STP message processor assigned to the Sigtran connection, wherein assigning one of the STP message processors to the Sigtran connection based on results of the Sigtran connection distribution algorithm includes maintaining a group count for each of the STP message processors, where the group count is indicative of a number of Sigtran connections assigned to each of the available STP message processors, calculating, for each of the available STP message processors, a group count difference between the group count for the STP message processor and a lowest group count of the available STP message processors, and including, as connection distribution candidates, available STP message processors having the group count difference that is less than a link distribution threshold; and
    at the STP message processor assigned to the Sigtran connection, receiving the Sigtran message, accepting the Sigtran connection, and responding to the remote SS7 peer that sent the Sigtran message.

2. The method of claim 1 wherein the STP message processors comprise physical message processors of a physical STP.

3. The method of claim 1 wherein the STP message processors comprise virtual message processors of a virtual STP.

4. The method of claim 1 comprising associating the IP address with loopback interfaces of the STP message processors.

5. The method of claim 1 comprising detecting failure and reconnection of one of the STP message processors and, in response, using the reconnected STP message processor as a candidate for Sigtran connection distribution.

6. The method of claim 1 comprising receiving a subsequent message associated with the Sigtran connection, determining that one of the available STP message processors has been assigned to the Sigtran connection, and forwarding the subsequent message to the available STP message processor assigned to the Sigtran connection.

7. The method of claim 1 comprising forwarding egress traffic from the STP message processors of the STP to the remote SS7 peers in a manner that bypasses the connection load balancer.

8. A system for distributing Sigtran connections among signal transfer point (STP) message processors, the system comprising:
- a signal transfer point (STP) including a plurality of message processors, wherein the message processors are STP message processors that route Sigtran messages received on Sigtran connections with remote SS7 peers;
- a connection load balancer separate from the STP that operates as a front end to the STP message processors of the STP for load balancing Sigtran connections among the STP message processors in a manner that is transparent to the remote SS7 peers, wherein:
- the Sigtran connections are Internet-protocol (IP)-based connections between the remote SS7 peers and the STP message processors over an IP network, the connection load balancer is configured to transparently re-distribute the IP-based connections among the STP message processors in response to changes in operational status of the STP message processors without requiring reconfiguration of the remote SS7 peers;
- the connection load balancer is configured to publish an Internet protocol (IP) address to the remote SS7 peers by broadcasting gratuitous address resolution protocol (ARP) or Internet control management protocol version 6 (ICMPv6) neighbor discovery messages that associate the IP address with a medium access control (MAC) address of the connection load balancer;
- the STP message processors are initialized to listen on the IP address published by the connection load balancer;
- the connection load balancer is configured to:
  - receive a Sigtran message addressed to the IP address and transmitted by one of the remote SS7 peers in response to failure of one of the STP message processors to reconnect a link formerly connected to the failed STP message processor,
  - determine that the Sigtran message is an initial message for establishing a Sigtran connection,
  - assign, to the Sigtran connection and based on results of a Sigtran connection distribution algorithm, one of the STP message processors that is available to handle the Sigtran connection and forward the Sigtran message to the available STP message processor assigned to the Sigtran connection, wherein assigning one of the STP message processors to the Sigtran connection based on results of the Sigtran connection distribution algorithm includes maintaining a group count for each of the STP message processors, where the group count is indicative of a number of Sigtran connections assigned to each of the available STP message processors, calculating, for each of the available STP message processors, a group count difference between the group count for the STP message processor and a lowest group count of the available STP message processors, and including, as connection distribution candidates, available STP message processors having the group count difference that is less than a link distribution threshold; and
- wherein the STP message processor assigned to the Sigtran connection receives the Sigtran message, accepts the Sigtran connection, and responds to the remote SS7 peer that sent the Sigtran message.

9. The system of claim 8 wherein the STP message processors comprise physical message processors of a physical STP.

10. The system of claim 8 wherein the STP message processors comprise virtual message processors of a virtual STP.

11. The system of claim 8 wherein the IP address is associated with loopback interfaces of the STP message processors.

12. The system of claim 8 wherein the connection load balancer is configured to detect failure and reconnection of one of the STP message processors and, in response, using the reconnected STP message processor as a candidate for Sigtran connection distribution.

13. The system of claim 8 wherein the STP message processors are configured to forward egress traffic from the STP to the remote SS7 peers in a manner that bypasses the connection load balancer.

14. A non-transitory computer readable medium having stored thereon executable instructions that when executed by a processor of a computer control the computer to perform steps comprising:
- providing a signal transfer point (STP) including a plurality of message processors, wherein the message processors are STP message processors that route Sigtran messages received on Sigtran connections from remote SS7 peers;
- providing a connection load balancer separate from the STP as a front end to the STP message processors of the STP for load balancing Sigtran connections among the STP message processors in a manner that is transparent to the remote SS7 peers, wherein the Sigtran connections are Internet-protocol (IP)-based connections between the remote SS7 peers and the STP message processors over an IP network, the connection load balancer is configured to transparently re-distribute the IP-based connections among the STP message processors in response to changes in operational status of the STP message processors without requiring reconfiguration of the remote SS7 peers;
- publishing, by the connection load balancer, an Internet protocol (IP) address to the remote SS7 peers, wherein publishing the IP address to the remote SS7 peers includes broadcasting, by the connection load balancer, gratuitous address resolution protocol (ARP) or Internet control management protocol version 6 (ICMPv6) neighbor discovery messages that associate the IP address with a medium access control (MAC) address of the connection load balancer;
- initializing the STP message processors of the STP to listen on the IP address published by the connection load balancer;
- receiving, at the connection load balancer, a Sigtran message addressed to the IP address and transmitted by one of the remote SS7 peers in response to failure of one of the STP message processors to reconnect a link formerly connected to the failed STP message processor;
- determining, by the connection load balancer that the Sigtran message is an initial message for establishing a Sigtran connection;
- assigning, to the Sigtran connection and based on results of a Sigtran connection distribution algorithm, the Sigtran connection to one of the STP message processors and forwarding the Sigtran message to the STP message processor assigned to the Sigtran connection, wherein assigning one of the STP message processors to the Sigtran connection based on results of the Sigtran connection distribution algorithm includes maintaining a group count for each of the STP message processors, where the group count is indicative of a number of Sigtran connections assigned to each of the available STP message processors, calculating, for each of the available STP message processors, a group count difference between the group count for the STP message processor and a lowest group count of the available STP message processors, and including, as connection distribution candidates, available STP message processors having the group count difference that is less than a link distribution threshold; and at the STP message processor assigned to the Sigtran connection, receiving the Sigtran message, accepting the Sigtran connection, and responding to the remote SS7 peer that sent the Sigtran message.

\* \* \* \* \*

UNITED STATES PATENT AND TRADEMARK OFFICE
CERTIFICATE OF CORRECTION

PATENT NO. : 10,999,202 B2  
APPLICATION NO. : 16/206592  
DATED : May 4, 2021  
INVENTOR(S) : Kumar et al.

Page 1 of 1

It is certified that error appears in the above-identified patent and that said Letters Patent is hereby corrected as shown below:

On the Title Page

On page 3, Column 1, Item (56) under Other Publications, Line 15, delete "RFeport" and insert -- Report --, therefor.

On page 4, Column 2, Item (56) under Other Publications, Line 4, delete "fo" and insert -- of --, therefor.

On page 4, Column 2, Item (56) under Other Publications, Line 23, delete "-Spectific" and insert -- -Specific --, therefor.

In the Claims

In Column 15, Line 24, in Claim 8, delete "Internet Protocol (IP)" and insert -- IP --, therefor.

In Column 16, Line 62, in Claim 14, after "sors" insert -- available to handle the Sigtran connection --.

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*